May 25, 1965  F. G. DE BRIE PERRY  3,184,990
TRANSMISSION CONTROL SYSTEM
Filed March 2, 1962  8 Sheets-Sheet 3

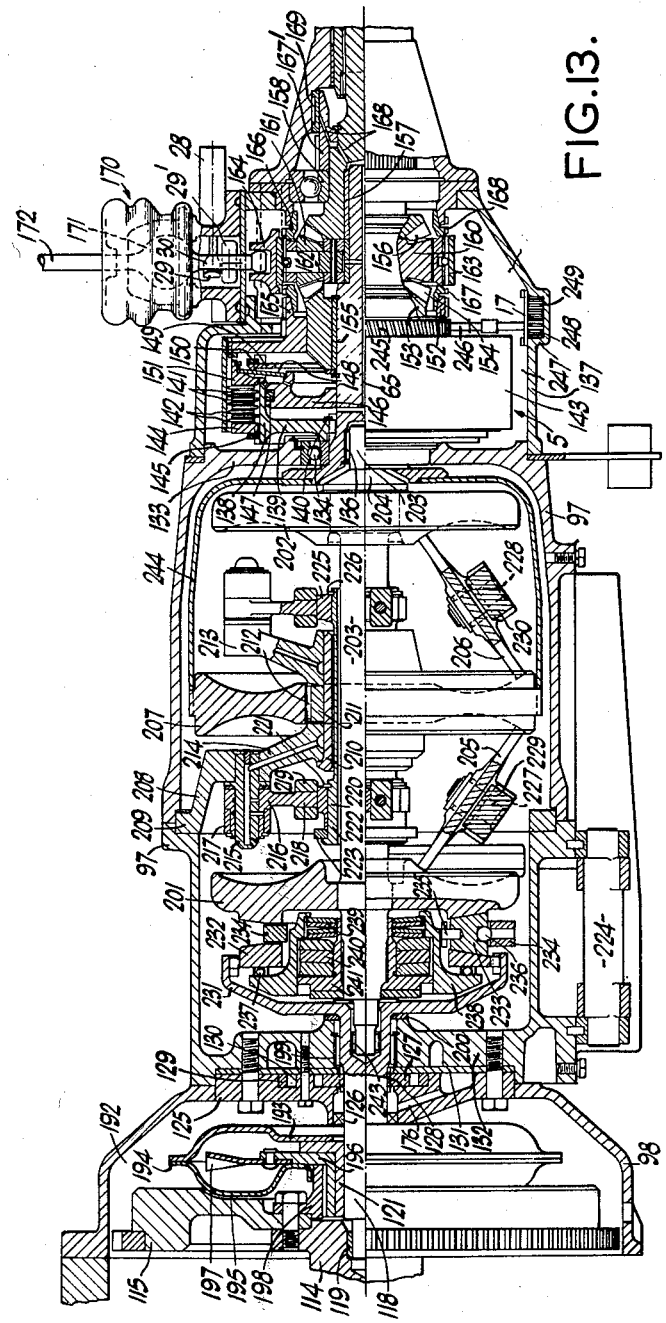

United States Patent Office 3,184,990
Patented May 25, 1965

3,184,990
TRANSMISSION CONTROL SYSTEM
Forbes George de Brie Perry, Felbridge, East Grinstead, England, assignor to National Research Development Corporation, London, England, a British corporation
Filed Mar. 2, 1962, Ser. No. 177,085
Claims priority, application Great Britain, Mar. 6, 1961, 8,168/61
20 Claims. (Cl. 74—472)

This invention relates to a transmission system for coupling a prime mover to a load and particularly to a transmission system which incorporates a variable ratio transmission unit of the type the ratio of which can be changed only whilst the input shaft and/or the output shaft of the unit is rotating.

According to the invention there is provided a transmission system for coupling together a prime mover, a variable ratio transmission unit of the type described, and a load, comprising a coupling between the transmission unit and the load, the said coupling being controllable to permit relative rotation between the transmission unit and the load for at least one direction of torque transmission through the transmission system, controlling means for the said coupling operable to put the same into a torque-transmitting condition in dependence upon the rotational speed of a rotating part of the transmission system and means operable under control of rotation of the load, where such rotation results from forces other than torque transmitted to the load from the prime mover, and independently of the said controlling means, to put the said coupling into a torque-transmitting condition at least for the other direction of torque transmission through the transmission system.

According to the invention there is further provided a transmission system for coupling together a prime mover, a variable-ratio transmission unit of the type described, and a load, comprising a coupling between the transmission unit and the load controllable to allow relative rotation between the transmission unit and the load for at least one direction of torque transmission through the transmission system, controlling means for the said coupling operable to put the same into a torque-transmitting condition in dependence upon the rotational speed of a first rotatable part of the transmission system between the prime mover and the said coupling and means operable, on rotation in one predetermined direction of rotation of a second rotatable part of the transmission system which second part is coupled to the load otherwise than by the said coupling, to put the said coupling into a torque-transmitting condition at least for the other direction of torque transmission through the transmission system, where rotation of the said second part results from forces other than torque transmitted to the load from the prime mover.

According to the invention there is yet further provided a transmission system for coupling together a prime mover, a variable ratio transmission unit of the type described, and a load, comprising a first coupling interposed between the output shaft of the transmission unit and the load, such first coupling being operable to a condition in which it permits relative rotation between the transmission unit and the load at least in the direction of torque transmission in which the prime mover would apply torque to the load and a second coupling, interposed between the prime mover and the input shaft of the transmission unit and adapted, at speeds below a predetermined speed on the part of the member of the second coupling which is connected to the input shaft of the transmission unit, to have a relatively low torque-transmitting capacity at least in the direction of torque transmission in which torque would be applied to the prime mover from the said input shaft when it rotates in a direction which is the same as the normal rotational direction of the prime mover.

It is convenient at this stage to specify the nomenclature to be used herein for defining the ratio of the variable ratio transmission unit.

It is the practice, in connection with road vehicles, to speak of "high gear" and "low gear" as meaning respectively a high ratio of output speed/input speed and a low ratio of output speed/input speed and it is proposed to conform to this convention by referring to the ratio of the transmission unit in terms of output speed/input speed. Thus a "high" ratio is one in which the side of the transmission unit connected to the prime mover (the input side), rotates at a relatively low speed and the side of the transmission unit connected to the load (the output side), rotates at a relatively high speed whereas a "low" ratio is one in which the input side rotates at a relatively high speed and the output side rotates at a relatively low speed.

The invention will be more readily understood from the following description of certain embodiments thereof, designed for a vehicle installation, which are illustrated in the accompanying drawings in which:

FIGURE 13 is a drawing of the principal mechanical parts of an embodiment of the invention.

FIGURE 1 shows an elementary lay-out.

Figure 1:
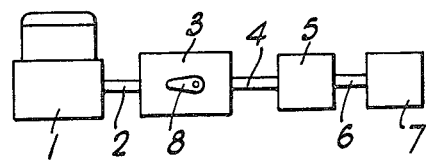
FIGURES 1, 2 and 4 are block schematic diagrams of three basic arrangements according to the invention.

An engine 1 is connected to a shaft 2 which is the input shaft to a variable ratio transmission unit 3 (hereinafter called the "transmission unit"). Output shaft 4 of the transmission unit is connected to a clutch 5 which is in turn connected by a shaft 6 to a load 7. The ratio of the transmission unit is varied by means of a lever 8.

It is at present a common practice to incorporate a clutch (or the equivalent) between the primer mover and the transmission system and to couple the output of the transmission system directly to the load. With this arrangement, if the load is at rest and if the variable ratio unit has previously come to rest in a high ratio condition the load has to be started under conditions demanding from the prime mover high torque at low revolutions. Some prime movers may be capable of starting the load under such conditions, the transmission unit being changed to a low ratio condition as soon as possible after the load, and therefore the variable ratio transmission unit, has started to rotate. However, this is ex hypothesi undesirable because, if the prime mover is flexible enough to rotate the load from rest without the aid of a variable ratio device in the low gear condition the variable ratio device could be dispensed with altogether.

With the arrangement of FIGURE 1, with the clutch disengaged, the prime mover may be started, and with it the variable ratio transmission unit, under no-load conditions. The transmission unit may then be adjusted to any desired ratio for starting the load from rest, either before or during the engagement of the clutch.

If an automatic clutch is used, it may be of the type which is engaged in dependence on the rotational speed of some part of the rotating system.

When this element is the input shaft of the variable ratio transmission unit the clutch need not engage until the ratio of the transmission unit has been suitably adjusted, which can be effected at the idling speed of the prime mover. The prime mover may then be accelerated to engage the clutch. Alternatively the ratio may be changed during the engagement of the clutch.

It is a further advantage of the FIGURE 1 arrangement that it facilitates the use of a variable ratio transmission unit of the type which must not be rotated in the reverse direction. An example of a transmission of this type is a rolling friction drive having toroidal races interconnected by disc-like rollers which can be slewed in unison, each in a plane containing the axis of the races and the centre of the roller, so as to vary differentially the radii on the races at which the rollers make contact. Such a transmission unit is hereinafter called a "toroidal race rolling friction transmission unit." Although the term "rolling friction" is used above it should be realised that devices which transmit rotation through the medium of smooth surfaces in rolling engagement are almost invariably bathed in oil or other fluid to provide lubrication and cooling. It is now generally understood to be the case that the fluid forms a thin film between the co-operating surfaces preventing direct contact between them so that the drive is not transmitted by friction, in the true sense of that term, betwen the two metal surfaces which are in rolling engagement and in metal-to-metal contact but by the shear resistance of the thin film of oil.

A common method of changing the ratio of a toroidal race rolling friction transmission unit is to tilt the rollers in a manner such that they steer themselves to different parts of the races. In order that the rollers shall steer themselves to a certain attitude and stop in that attitude, for any given setting of a control member setting up the initial tilt of the rollers, the geometry of the roller mountings must be such that a tilt motion initially displaces the rotational axes of the rollers so that they do no intersect the common axis of the races, whereas the resulting change of ratio attitude brings the rollers to a position at which their axes again intersect the axis of the races, at which position a stable ratio attitude of the rollers is reached. It is difficult to arrange the geometry of the roller mountings so that the rollers when tilted steer themselves to a stable position whatever the direction of rotation of the races and the rollers, indeed the only known examples of the solution of this problem involve a changeover from one condition to another of part of the roller control mechanism on a change of direction of rotation.

With a rotationally unidirectional transmission unit which is coupled directly to the load, it is necessary to ensure that the load cannot impose rotation on the transmission unit in the wrong direction. For instance where the load consists of the driving wheels of a vehicle the vehicle must not be allowed to drift backwards, for instance on a hill, for this would rotate the transmission unit in the reverse direction. It should be mentioned, in connection with a conventional transmission system for a vehicle, that, with the clutch sited between the prime mover and the variable ratio transmission unit, there is usually provided a simple gear train, capable of a neutral, a forward, and a reverse condition, between the output of the transmission unit and the load. Should this gear train be in the neutral condition, drifting backwards would not rotate the transmission at all and no harm would be done. Frequently however a driver will not change the gear train to neutral on stopping, say behind another vehicle on a hill, and if the vehicle ahead starts to fall back on him he may well try to retreat out of the way without remembering first to change the gear train to neutral. As toroidal race rolling friction transmission units not provided with a reverse rotation facility will in general become locked by progressive canting of the rollers from the true direction of rolling on the races, it will be seen that reverse rotation can be disastrous particularly if, as is usually the case, the transmission unit can only be freed from this locked condition by dismantling it. The trouble can be guarded against to some extent by providing a unidirectional brake or "sprag" on the output shaft of the transmission unit so that reverse rotation is positively prevented. In the circumstances above outlined however the driver would not be able to fall back away from the vehicle ahead unless he was able to set the gear train to neutral. As the gear train becomes loaded by transmitting the braking force of the sprag to the road wheels, however, the gear train cannot be disengaged. If the vehicle could be driven forward by the prime mover the load on the gear train could be removed and the gear changed to neutral. The transmission unit may be, and frequently in practice will be, in a high ratio setting in such circumstances and the prime mover will not be able to move the vehicle in that ratio. Should this happen the vehicle cannot be moved without jacking up the wheels to unload the gear train so that it can be changed to neutral.

These difficulties are overcome by siting the clutch between the transmission unit and the load.

Figure 2:
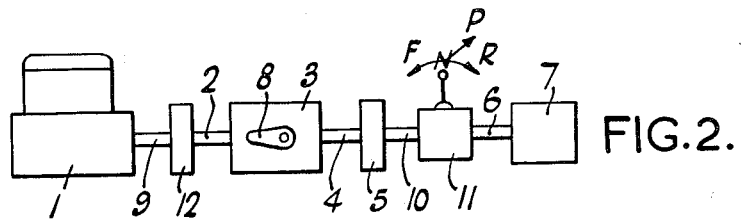

FIGURE 2 shows a somewhat more detailed layout.

The engine 1 is connected to input shaft 2, not directly as in FIGURE 1, but via a shaft 9 and a variable slip coupling 12. The clutch 5 is connected to the load 7, not directly as in FIGURE 1, but via a shaft 10 and a simple gear train 11 providing "forward," "neutral," and "reverse" conditions.

It is frequently required of a vehicle installation that the engine shall be capable of being started from rest by rotation of the load by some external agency, e.g. by towing the vehicle or allowing it to roll down a hill. If the transmission unit happens to be in a low ratio condition at the commencement of this operation the torque required at the driving wheels is excessive and the ratio of the transmission unit cannot be changed without first rotating the engine, in the arrangement of FIGURE 1. The variable-slip coupling 12 permits rotation of the transmission unit 3 without the necessity of rotating the engine 1, so that the ratio of transmission unit 3 can be changed by operation of lever 8, to a higher ratio which reduces the torque required at the driving wheels of the vehicle on ultimate engagement of coupling 12. This operation is hereinafter referred to as "tow starting." For tow starting the gear train must first be engaged, preferably in the "forward" condition and clutch 5 engaged.

To enable further facilities to be provided, which will be hereinafter explained, a somewhat more elaborate arrangement is required.

Figure 4:
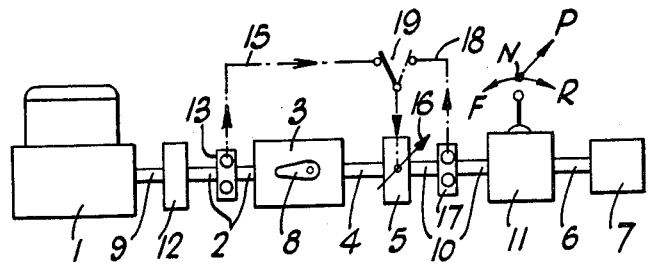

FIGURE 4 shows an example of such an arrangement.

Clutch 5 is an automatic clutch engaged and disengaged in dependence, at least partially, upon the speed of rotation of input shaft 2 and this dependence is secured by means of a speed-sensing device 13 associated with shaft 2. Preferably clutch 5 is hydraulically operated and device 13 is an hydraulic pump actuated by shaft 2. Device 13 will therefore be hereinafter referred to as a pump.

In FIGURE 4 the arrow 16 indicates variability of the torque transmitting capacity of clutch 5 between a condition in which it is disengaged and a condition in which it can transmit at least the full torque of the engine 1 in the lowest ratio of transmission unit 3. The clutch 5 need not be capable of complete disengagement in the sense that it will transmit no torque at all. A certain amount of residual drag can be tolerated in the so-called disengaged condition so long as it is possible to hold the vehicle stationary, by means of wheel brakes for instance.

The chain dotted line 15 joining pump 13 to arrow 16, via a changeover device 19 described below, indicates the control of variability of the torque transmitting capacity of clutch 5 in dependance (at least partially) upon the rotational speed of pump 13.

When the engine 1 is idling the pressure delivered by pump 13 is insufficient to engage clutch 5 but when the speed of engine 1 is increased the pressure rises and clutch 5 engages to move the vehicle, provided that gear train 11 has first been set to either the "forward" or the "reverse" condition.

It is frequently required that the engine shall be capable of use as a brake, for instance when the vehicle is descending a long hill, a facility hereinafter referred to as "engine braking."

Arrangements are made for the over-riding manual adjustment of the ratio of transmission unit 3 to a suitable low ratio and pump 13 will normally be revolving at a speed sufficient to ensure engagement of clutch 5. If for any reason, however, the vehicle is arrested part-way down a hill by means of wheel brakes for instance, and is then allowed to move off again, a dangerous situation may arise because the engine will have been allowed to fall to idling speed and the clutch 5 will have disengaged. When the vehicle again moves forward down the hill the engine braking facility will be absent due to disengagement of clutch 5, unless the driver accelerates the engine to a speed at which pump 13 again delivers a pressure sufficient to re-engage clutch 5. This is not an instinctive reaction for a driver with no mechanical knowledge. The arrangement of FIGURE 4 overcomes this difficulty by means of a second speed-sensing device, again preferably an hydraulic pump and called pump 17, mounted on and/or driven by shaft 10.

Clutch 5 is engaged under control of either pump 13 or pump 17 according to the setting of a changeover device 19, which in an hydraulic system, takes the form of a valve and will be called valve 19.

The clutch 5 is required to be under control of pump 17 when it must be engaged at a time when the speed of pump 13 is inadequate for the purpose, e.g. for tow starting or for the resumption of engine braking when descent is resumed after the vehicle has been stopped part-way down a hill.

Valve 19 may be controlled manually, for instance by means of the demand member by which a suitable ratio of the transmission unit is selected for engine braking but it is preferably operated automatically by the pressures from the two pumps 13 and 17, the greater of the two pressures actuating the valve to connect to clutch 5 the pump producing that pressure.

Certain detailed designs based on FIGURE 4 will now be described.

Figure 11:
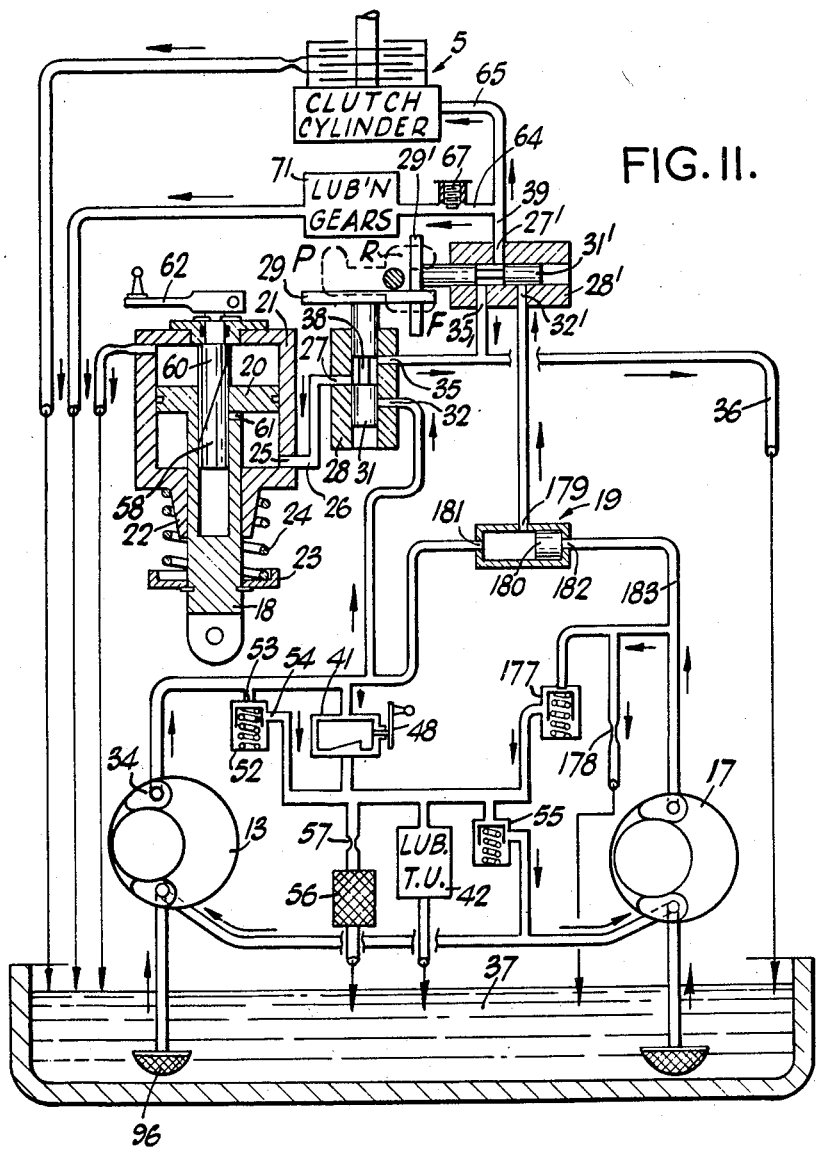
FIGURE 11 is a schematic diagram of an hydraulic circuit for an embodiment of the invention.

FIGURE 11 shows the hydraulic circuit of a design based on FIGURE 4. In this design a toroidal race rolling friction transmission unit is used in the role of transmission unit 3, and it is of the type in which changes of ratio are initiated by tilting the rollers by means of a central control member to which the roller mountings are mechanically linked, the torque reaction of the rollers being applied to this central control member so that it is one of the forces affecting control of ratio. The central control member is coupled by a mechanical linkage to the piston rod 18 of a double-acting hydraulic actuator which is in effect two actuators one of which is concerned with ratio control in normal driving conditions and the other of which is concerned with the selection of a suitable ratio for engine braking. Piston rod 18 carries a piston 20 slidable within a cylinder 21. A gland 22, integral with one of the ends of cylinder 21, surrounds piston rod 18 and a cup 23, secured to the lower end of piston rod 18, forms an abutment for a compression spring 24 the other end of which surrounds gland 22 and abuts against the outer face of the lower end of cylinder 21. An entry port 25 provides access to the lower part of cylinder 21 for pressurised fluid.

Upward movement of piston 20 results in a rise in the ratio of transmission unit 3 and vice versa. Spring 24 is therefore tending to drive transmission unit 3 into a lower ratio and, when the direction of torque transmission is in the sense in which the engine would drive the load, the torque reaction of the rollers is acting in assistance of spring 24. The function of spring 24 is explained below in connection with the graphs of FIGURES 6, 7 and 8.

A fluid line 26 communicates with port 25 and connects it to the outlet port 27 of a valve 28 which is operated by a bar 29 actuated by the control rod 30 by which the various conditions of gear train 11 are selected so that in certain conditions of the gear train 11 pressurised fluid is cut off from cylinder 21 for reasons to be explained below. Valve 28 has two additional ports spaced apart from and on either side of port 27 along the direction of travel of the spool of valve 28. One of these ports is an inlet port 32 communicating via pressure line 33 with the outlet port 34 of pump 13. The other of these additional ports of valve 28 is an exhaust port 35 communicating via a fluid line 36 with a fluid sump 37.

When control rod 30 is operated to put gear train 11 into the "forward" condition it is first moved in a downward direction (in relation to the drawing), whereby bar 29 is also moved downwards so that the groove 38 of spool 31 places ports 32 and 27 into communication and connects the lower part of cylinder 21 to pressure line 33 from pump 13. A second valve of similar type and oriented at right angles to valve 28 has the same reference numerals, primed, as those of valve 28, for indicating corresponding parts. The connection of port 35' is the same as that of port 35 but port 32' is connected to a port of valve 19 to be described below and port 27' is connected to clutch 5 via pressure line 39.

To complete the conditioning of the transmission system for forward drive control rod 30 must be moved to the right into one of two lateral slots of a gate 40 indicated by dotted lines. This rightward movement of rod 30 operates valve 28' to put clutch 5 into communication with valve 19 and thence with pressure line 33 from pump 13 so that the vehicle may be moved off when the pressure from pump 13 is sufficient to actuate clutch 5.

To engage reverse, control rod 30 is moved upwards and to the right. Valve 28' is operated to connect clutch 5 to pressure line 33 in the same way as for forward driving but valve 28 is not operated and remains in the position shown in FIGURE 5. The effect of this is to move piston 20 to the bottom of its stroke under the influence of spring 24 so that the transmission unit 3 remains in lowest ratio, since valve 28 cuts off pressure line 33 from cylinder 21. This is a precaution against the attainment of excessive speed in reverse.

Control rod 30 engages the gear train 11 at the end of its upwards or downward movement in gate plate 40. The additional movement to the right enables the clutch to be engaged. The converse leftward movement of control rod 30 disengages the clutch through the agency of valve 28' so that the gears of gear train 11 are unloaded and so can be disengaged without skillful adjustment of engine speed. This facilitates rapid alternation between forward and reverse driving which is useful for extricating the vehicle from mud or snow. This operation is commonly called "snow rocking."

The gate 40 has one other branch leading forwards from the central transverse "neutral" slot. This, marked "P," relates to a "Parking lock" device for immobilising the vehicle when it is left unattended as an insurance against failure of the hand brake. When the gear lever is moved into slot "P" reverse gear is engaged, and a spring loaded pawl, normally held retracted by a cam, is released by leftward movement of control rod 30 and this pawl, which is pivoted to the gear train casing moves into engagement with one of the gears in gear train 11. Engagement of reverse is not essential of course but it is convenient in the detailed design described below in relation to FIG. 13.

The ratio of the transmission unit during forward driving conditions is governed by the torque reaction at the rollers aided by spring 24 tending towards a low ratio, opposed by the fluid pressure from line 33 acting on the underside of piston 20, tending towards a high ratio. The driver can control the pressure in pressure line 33 by means of an adjustable bleed valve 41, which drains, to an adjustable extent, the pressure line 33 to the lubrication ducts of the transmission unit 3 (shown diagrammatically as a rectangle 42), whereby the need for a separate lubricant pump is avoided.

Figure 5:
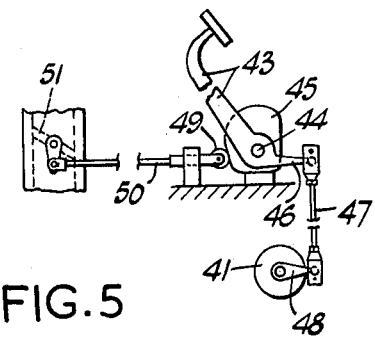
FIGURE 5 is a drawing of a mechanism for operating a valve used in an embodiment.

Bleed valve 41 is connected to the pedal by which the supply of fuel to the engine is controlled. FIGURE 5 shows a mechanism by which this may be brought about. A pedal 43 is pivoted on a spindle 44 to which it and a cam 45 are fixed. An extension arm 46, integral with pedal 43, is coupled by a ball-jointed link 47 to the operating crank 48 of bleed valve 41. A cam follower 49 rides on the controlling edge of cam 45 and is connected by a rod 50 to the fuel control means for the engine, shown in the drawing as the throttle valve 51 of a craburetor. The controlling edge of cam 45 is shaped so that the throttle 51 is fully opened during a small initial part of the travel of pedal 43 whereafter further movements of pedal 45 are effective only to open further the bleed valve 41 which tends to lower the ratio of transmission unit 3 by reducing the pressure of the fluid from line 33 acting on the underside of piston 20.

Also bridged between pressure line 33 and the lubrication system 42, is a pressure relief valve 52 having a piston 53 spring-loaded to a position in which it covers an outlet port 54. The spring is chosen so that the piston moves to uncover port 54 when the pressure from pressure line 33, acting against piston 53, reaches a predetermined maximum operating pressure, say 50 lbs. per square inch. The flow from outlet port 54 of valve 52 passes to the lubrication ducts (indicated schematically by rectangle 42) of transmission unit 3, an arrangement which enables a separate lubrication pump for transmission unit 3 to be dispensed with. Another similar pressure relief valve 55, set to have a "blow off" pressure which is a suitable maximum for the lubrication system 42, say 10 lbs. per square inch, is connected to the low pressure sides of bleed valve 41 and relief valve 53 and discharges, when the pressure exceeds that value, into the inlet port 95 of pump 13, as a precaution against starvation of pump 13 if the sump should accidentally run dry. Pump 13 also draws fluid from sump 37 via a filter 96 submerged below the level of the fluid in sump 37. A filter 56 in series with a restrictor orifice 57 is connected in parallel with the lubrication system 42 and acts in known manner as a by-pass filter.

Piston rod 18 is bored out internally to receive a valve member 58 which is mounted for rotation in a sealing gland 59 in the upper end of cylinder 21. Valve member 58 has a V-shaped recess 60 in its surface bounded by one edge running axially of the valve member and another edge in the form of about ⅙ of a turn of a helix, extending almost the full length of the valve member. Normally valve member 58 presents an unbroken face closing off a port 61 communicating between the lower part of cylinder 21 and the internal bore of piston rod 18. An external projection of valve member 58 carries a crank arm 62 and when this is turned in a direction such that its extremity would rise upwards from the surface of the drawing, the recess 60 uncovers port 61 with its helical edge whereby pressurised fluid is enabled to pass from the lower part of cylinder 21 to the upper part.

The pressure on both sides of piston 20 is then equal and as the effective area of the upper side of piston 20 is greater by the difference between the cross sectional areas of piston rod 18 (disregarding the bore therein) and valve member 58 there will be a net force tending to force piston 20 downwards and so lower the ratio of transmission unit 3. Such downward movement continues until the helical edge of recess 60 again covers port 61 and stops the flow of fluid to the upper side of piston 20. The position reached by piston 20 depends upon the angle through which valve member 58 is turned. To prevent the upper part of cylinder 21 from forming an hydraulic lock on piston 20 a leak 63 is provided which permits fluid in the upper part of cylinder 21 to drain away to sump 37. This drain is not large enough to interfere with the positional servo control of piston 20 by means of valve 58 but it is large enough to enable the piston to move up and down with only a small and desirable amount of damping under the influence of pressure fluid acting on the underside of piston 20 when valve 58 is not in operation.

Valve 58 is the means by which a suitable low ratio of the transmission unit 3 may be selected for engine braking.

For a given applied torque at shaft 2 the torque reaction at the roller mountings of transmission unit 3, is lower at high ratios and higher at low ratios. Spring 24 augments the downwards thrust on piston 20 to a greater extent when the piston is at the upper end of the cylinder and the rate of this spring is preferably chosen so that, for the maximum torque of which the prime mover is capable the force tending to drive piston 20 downwards is independent of the position of the piston and therefore independent of the ratio to which the transmission unit is set. At lower values of input torque the downwards force on piston 20 is somewhat higher at high ratios than it is at low ratios of the transmission unit, but the variation is nevertheless much less than it would be with the spring 24 omitted.

When the pedal 43 has been operated to the point at which throttle 51 is fully open the performance of the transmission system is regulated by varying the pressure below the piston 20 by means of the bleed valve 41. Depression of pedal 43 opens bleed valve 41 and lowers the pressure below piston 20 which moves downwards by virtue of the constant force from the torque reaction of the transmission unit, aided by spring 24. This unbalance of the forces acting on the piston 20 would drive it to the bottom of the cylinder 21 were it not for the fact that the speed of the prime mover will increase due to the lowering of the ratio of the transmission unit, and this will increase the speed of the pump 13 which will in turn raise the pressure below piston 20, assuming that the opening of bleed valve 41 remains unaltered. The piston 20 will therefore assume a new equilibrium position at a somewhat lower ratio of the transmission unit. If the load increases, for instance in the case of a vehicle installation on encountering a hill, the speed of the prime mover will fall. The pressure from pump 13 will also fall and the ratio of the transmission unit will become lower until the speed of the prime mover has again risen to a value sufficient to match the upward force acting on piston 20. Conversely if the load is reduced the prime mover will increase speed tending towards a higher ratio of the transmission unit which will tend to slow down the prime mover and pump 13 with an accompanying fall in the pressure below the piston 20, until a new equilibrium position is reached at a higher ratio of the transmission unit.

Pressure line 39 has two branches 64 and 65. Branch 64 passes through an adjustable restrictor 67 to lubrication ducts of gear train 11 (represented by a rectangle 71) from which it drains away to sump 37. Branch 65 leads to the clutch actuator, leading from which there is a small leak (not shown) through which a certain amount of fluid escapes on to the clutch plates to cool them, when a wet plate clutch is used. When a dry plate clutch is used any leakage from the actuator is directed away from the plates. Fluid leaking from the actuator eventually finds its way to sump 37.

The second pump, pump 17 has a pressure relief valve 177 in its output circuit; similar to valve 52 and similarly connected but having a lower release pressure (say 25 lbs. per square inch). Pump 17 is by-passed by a restrictor 178, the function of which is described below. The pressure inlet port 32' of valve 28' is connected to the output port 179 of changeover valve 19 having a single slidable plug fitting in a central bore the ends of which are closed save for entry ports 181 and 182 communicating respectively with fluid pressure line 33 from the output port of pump 13 and fluid pressure line 183 leading from the output port of pump 17.

The operation of valve 19 is as follows:

If the pressure in pressure line 33 exceeds that in pressure line 183 (as normally it will during forward driving conditions), plug 180 is driven over to the right, as it is shown in FIGURE 11, and ports 181 and 179 are in communication with one another. In this state of valve 19 clutch 5 operates from the pressure in pressure line 33. If, however, for any reason the speed of pump 13 falls to an extent such that the pressure delivered thereby is less than the pressure delivered by pump 17 then plug 180 will be driven over to the left and ports 182 and 179 will be placed into communication with one another so that clutch 5 will be under control of the output of pump 17 alone. Ratio cylinder 21 will still be under control of pump 13 and bleed valve 41, however.

This condition of valve 19 will arise principally in the following circumstances:

(a) The engine is stopped and the vehicle moves forward from causes external thereto, e.g. it rolls down a hill or it is towed by another vehicle.

(b) The engine speed drops to idling speed so that the fluid pressure output from pump 13 is insufficient to operate clutch 5, and the vehicle moves forward from causes external thereto, e.g. descent is resumed after a halt on a long hill.

In the case of (a), this is the tow starting condition. Pump 17 may be designed to develop sufficient pressure to engage clutch 5 when the vehicle has reached a relatively slow speed, say a little above walking speed. At such a road speed pump 17, if it was identical in type and mounting with pump 13 would be revolving at a speed comparable with engine idling speed which must be insufficient to engage clutch 5. Therefore pump 17 should preferably be arranged to build up pressure at lower speeds of the shaft from which its drive is obtained, than is the case with pump 13. The presence of release valve 177, which opens at a relatively low pressure prevents undue expenditure of power in pump 17 at high road speeds during normal driving, and as it discharges into the lubrication ducts (42) of transmission unit 3 any power expended serves a useful purpose whereby the size of pump 13 may be less than it would need to be if it alone had to supply the lubrication demands of transmission unit 3.

As soon as clutch 5 engages, transmission unit 3 starts to revolve and variable slip coupling 12 permits this to take place without, of necessity, turning the engine.

Normally the transmission unit 3 will be in its lowest ratio since, when the vehicle was stopped at the end of a previous journey the engine would have fallen to idling speed before being stopped and the pressure from pump 13 would have dropped below clutch engagement level and below the level at which it could overcome spring 24, so that piston 20 would have moved to the bottom of its stroke as the ratio of transmission unit 3 fell during the interval (however brief) between the slowing down and the stopping of the engine. This is normally desirable so that low ratio obtains when starting from rest.

At the start of the tow starting operation, gear train control rod 30 is moved downwards and to the right as for "forward" driving. After engagement of clutch 5 from pressure developed by pump 17, the input shaft 2 will be rotating at a higher speed than shaft 10 to which pump 17 is coupled. It may be therefore that pump 13 will, for a time, deliver enough pressure to operate valve 19 to the condition in which it is shown in FIGURE 11. Transmission unit 3 will however rapidly change to a higher ratio since torque reaction due to the drag of coupling 12 is reversed as compared with normal driving conditions and tends to raise piston 20, assisted by such pressure as is developed by pump 19, but opposed by spring 24. This causes pump 13 to slow down so that pump 17 will resume control of clutch 5. If the engine is very stiff the vehicle must be towed at a faster speed to enable the torque capacity of variable slip coupling 12 to build up to a value sufficient to "unstick" the engine. It may be therefore that pump 13 will reach a speed at which it delivers a pressure above the release pressure to which valve 177 is set, and if this happens valve 19 will again be operated to the position in which it is shown in FIGURE 11. This is of no consequence because it matters not by which pump clutch 5 is caused to engage so long as it is engaged.

When the engine starts it is necessary to disconnect it from the vehicle driving wheels promptly. This may be effected by moving gear train control rod 30 out of the "forward" slot of gate 40 so that valve 28' is operated to the position in which it is shown in FIGURE 11 whereby clutch 5 is cut off from its pressure supply and drained down to sump 37. "Forward" gear may then be disengaged at leisure by centralising rod 30.

The purpose of restrictor 178 is to obviate unwanted engagement of the clutch from pump 17 at very slow forward speeds of the vehicle. If, for instance because of a traffic hold-up the vehicle is halted some little distance behind a vehicle ahead and the road at this point slopes downwards, and if the vehicle is then allowed to drift forwards slowly to close up on the vehicle ahead pump 17 might engage clutch 5 which would result in a lurch forward on the part of the vehicle or the engine might be stalled. Restrictor 178 by-passes the output of pump 17 so that it cannot build up a pressure sufficient to engage clutch 5 at very low speeds but restrictor 178 may readily be given a characteristic such that the pressure across it builds up rapidly as the flow through it increases so that the clutch may be engaged during tow starting, at relatively slow vehicle speeds. A simple orifice has the required characteristic as the pressure drop across it varies as the square of the flow of fluid through it.

As to circumstance (b), this is the engine braking condition. The only requirement is that clutch engagement shall not be dependent solely on pump 13 but shall be automatic so long as the vehicle is moving at a fair speed. Gear train 11 would be in the "forward" condition with any normal driving technique and if it were not, it would be an instinctive reaction to make it so, for any driver with previous experience of a conventional manually controlled gear box. Once clutch 5 is engaged the speed of the engine and of pump 13 rises to a level sufficient to change over valve 19 and resume control of the clutch. Any arrangement which meets the tow starting requirements will readily satisfy the engine braking retention requirements.

Coupling 12 may take various alternative forms and three alternatives are described.

One such alternative is a coupling of the type generally known as a powder coupling. Couplings of this type are well known and comprise an annular shell coupled to the input shaft and a circular plate within the shell coupled to the output shaft, this plate being preferably of undulating form in the manner of a flutter wheel. Suitable seals provide a toroidal chamber within the shell in the centre of which the driven plate is accommodated. The chamber contains a quantity of comminuted material such as metal shot generally of the order of 0.5 of a millimeter in diameter. When the shell is rotated by the input shaft the shot is driven outwards by centrifugal force and compacted against the outer wall of the chamber gripping the driven plate so as to transmit the drive.

Powder couplings as hitherto known have the chamber only partially filled so that at low revolutions of the chamber a minimum of rotational drag is applied to the driven plate and the characteristic curve of maximum torque before slipping, plotted against the logarithm of the revolutions of the driving member, is an upwardly sloping straight line from the origin up to a certain speed of the driving member whereafter it flattens off so that, from the speed at which the curve flattens, further increases of speed do not increase the amount of torque which can be transmitted without slip. This type of device when used as a simple clutch, is operated well below the levelling point of the said curve but for use in the present invention it is possible to use the coupling as an overload relief device. A coupling may therefore be so chosen that the required overload relief torque falls at some point along the flat part of the characteristic. The normal requirement of low drag at low revolutions is not required in the present application as it is preferable not to have two automatic clutches in series since they would tend in practice to engage and disengage alernately. It is therefore proposed to fill the chamber to a degree considerably in excess of normal. This will not only permit the coupling to transmit the drive to a limited extent at low revolutions but it will also permit the coupling to be driven in the reverse direction because the normally driven plate, particularly if it is fluted, will be able to rotate the powder when it is almost entirely embedded in it and the powder will be driven outwards and compacted to provide a driving connection through the coupling. As the torque capacity of a powder coupling of this type falls off as the degree of filling of the chamber is reduced and increases as the degree of filling is increased, a relatively small powder coupling will suffice to transmit the drive from the prime mover to the transmission unit and by virtue of the righ degree of filling it will not disconnect the two when the prime mover is idling, but it will slip if the applied torque in either direction rises above the flattening out point of the characteristic curve. Further details of the manner of use of a powder coupling in the role of variable-slip coupling 12 will be given below in the description of a constructional design according to the invention.

Another alternative form for coupling 12 is a centrifugal clutch of the type which has a self servo action in the direction in which the engine would drive the transmission unit 3 but relies on centrifugal action only in the other (or over-run) direction of torque transmission. Further details of such a one-way self servo clutch will be given below in the description of a constructional design according to the invention.

A third alternative form for coupling 12 is a hydrokinetic coupling of the so-called fluid flywheel type, preferably with means for varying the degree of fluid filling to suit differing operating conditions. An example of such a coupling is hereinafter described in relation to FIG. 12 and FIG. 9.

Figure 6:
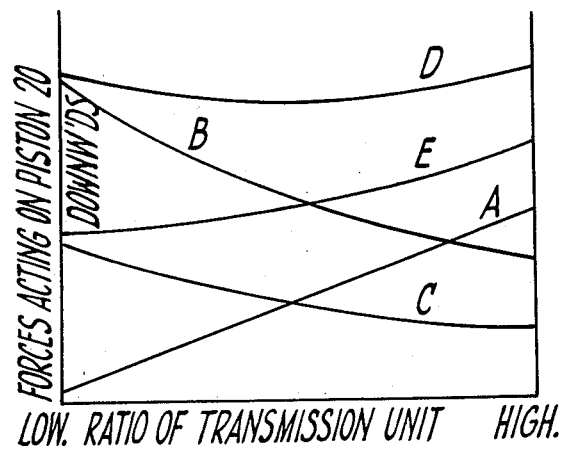
FIGURE 6 is a graph indicating forces acting in the ratio control system for a variable ratio transmission unit for use with the invention.

It will be observed that, when valve 19 is in the condition shown in FIG. 11, clutch 5 is operated by the same source of pressure as ratio control cylinder 21, this pressure being subject to variation under control of bleed valve 41. To understand how this becomes possible it is necessary to look more closely at the conditions under which ratio changes are effected. FIGURE 6 shows the downwards forces acting on piston 20 (tending to lower the ratio of transmission unit 3), plotted on a vertical scale, against ratios of the transmission unit 3 plotted on a horizontal scale.

Curve B represents the force arising from torque reaction at the rollers when the maximum torque of the engine is being applied to transmission unit 3. It varies with ratio, being highest in the lowest ratio. Curve A represents the force of spring 24 which is preferably arranged to have a very low preload at the lowest ratio (i.e. it is almost fully extended when piston 20 is at the bottom of its stroke). The rate of spring 24 is chosen so that it compensates as nearly as possible for the slope of curve B.

Curve D represents the sum of curves A and B and ideally it would be a horizontal straight line but in practice there will be some curvature owing to the curvature of curve B.

Curve C represents the forces arising from the torque reaction at the rollers when half the maximum torque of the engine is being applied to transmission unit 3.

Curve E represents the sum of curves A and C, and it slopes upwardly from its values at low ratios to its values at high ratios. This is of little practical consequence however. At any given equilibrium ratio the force acting on the underside of piston 20 as a result of the pressure in line 33 must exactly balance the combined forces arising from torque reaction at the rollers and from spring 24. If it did not do so the ratio would change. At full torque therefore the pressure varies little over the whole range of ratios, with the result that the control system tends to keep the engine speed constant, changing ratio according to load (i.e. road conditions), for any given setting of bleed valve 41, when the pedal 43 is in the region below the point at which throttle 51 is fully open.

In the case of half torque, the equilibrium pressure in line 33 is considerably lower at low ratios than obtains in the full torque case, though the difference is less in high ratios. The critical condition for clutch control is therefore the part torque low ratio condition, but so far as the clutch is concerned the reduction of torque enables it to avoid slipping at the reduced pressure.

The effect of the rise of curve E is that in any given ratio above the lowest ratio the engine speed will be higher than it would be if curve E were horizontal since pump 13 must revolve more quickly to provide the extra pressure to balance the rise of curve E. This means that, under part torque conditions, for any given position of pedal 43 the engine speed will rise as the ratio rises, whereas at full torque the engine speed remains substantially constant for any given pedal position the ratio changing automatically according to road conditions. This latter is the preferred performance but as the shape of cam 45 is designed to open the throttle fully in the early part of the travel of pedal 43, engine torque will be substantially constant and at its maximum value for a substantial part of an operating cycle. The tendency of the engine speed to rise with ratio in part torque conditions is readily counteracted by allowing pedal 43 to rise slightly and will only be noticed by a minority of drivers, since only slight pedal adjustment is necessary due to the square law characteristic of pressure-versus-opening of bleed valve 41.

Figure 7:
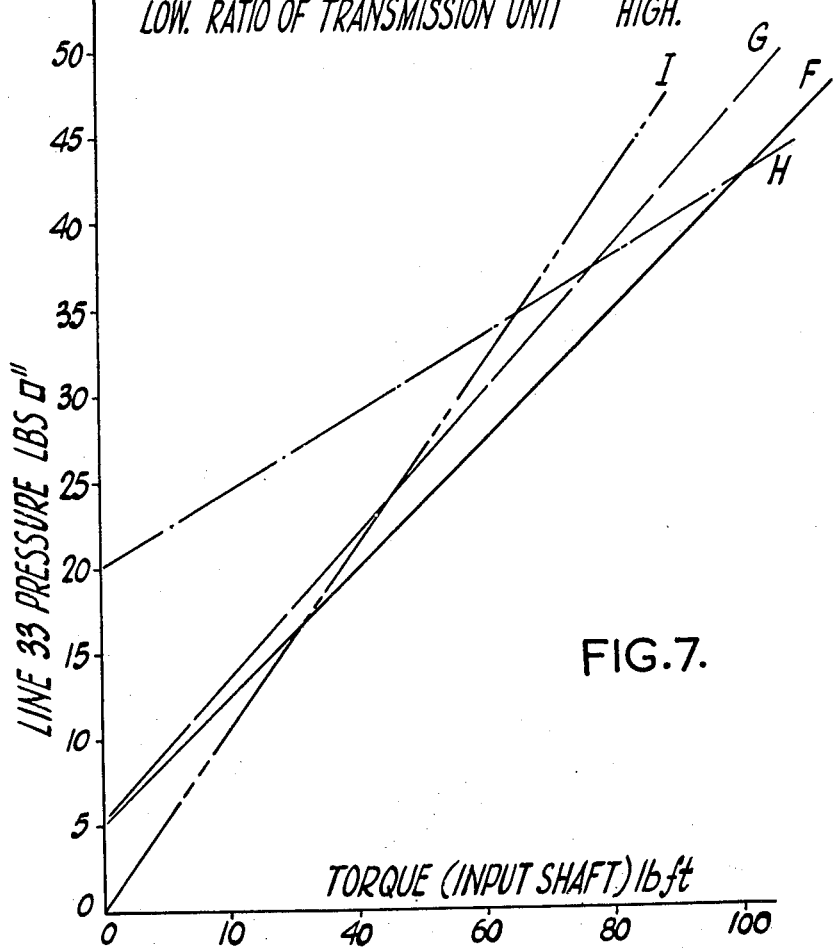
FIGURE 7 is a graph showing the characteristics of a clutch for use with the invention.
Figure 8:
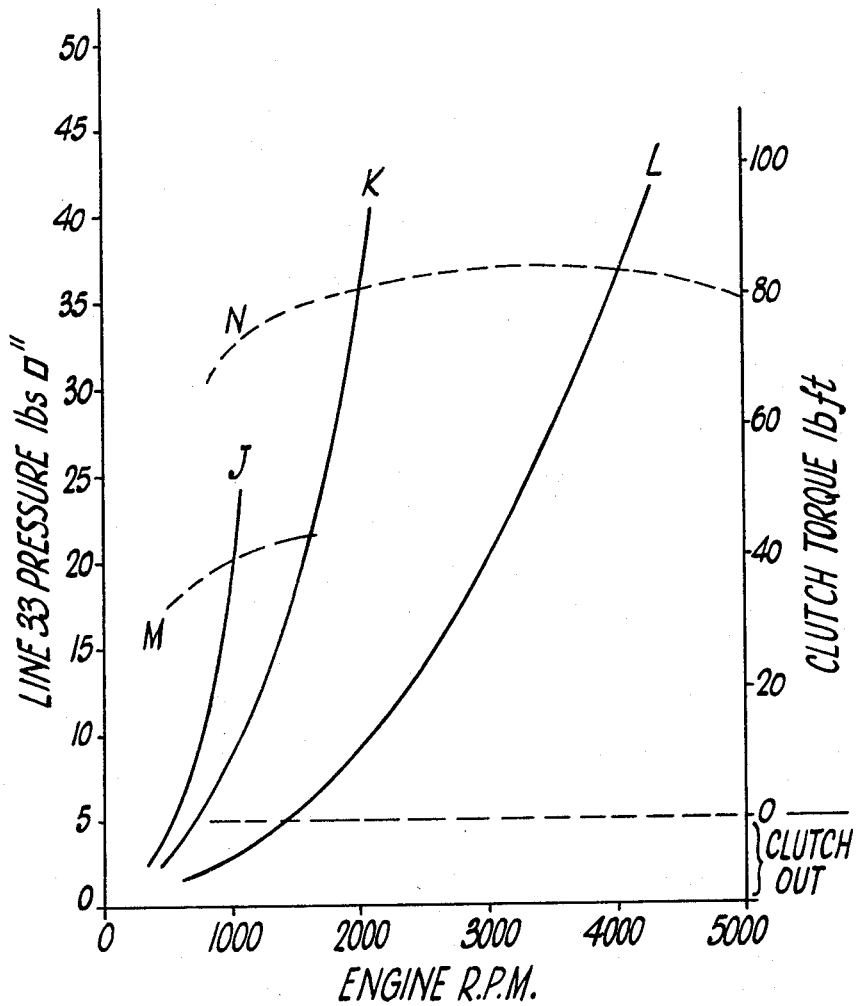
FIGURE 8 is a graph showing hydraulic pressure and torque values obtaining in various conditions in a transmission unit ratio and clutch control system for use with the invention.

The conditions obtaining when the clutch is to be engaged to move the vehicle from rest will now be examined in relation to FIGURES 7 and 8.

FIGURE 7 shows, plotted along a horizontal scale, the various values of torque at the input shaft of transmission unit 3 which, when multiplied by the torque multiplication of the transmission unit in lowest ratio, the clutch 5 will transmit (not necessarily without slipping), against pressures obtaining in line 33, plotted along a vertical scale.

It is advisable to have at least a small push-off spring for clutch 5 to ensure that it does not engage prematurely if the engine idling speed is adjusted at an abnormally high level, and also to overcome any residual adhesion between the clutch plates which might impede disengagement. This spring is assumed to have a preload or residual value such that it is overcome when the pressure in line 33 reaches 5 lbs. per square inch. It is assumed that the clutch torque capacity bears a linear relationship to actuating pressure so that the curve F, the clutch operating curve, is linear.

Turning now to FIGURE 8, the horizontal scale represents revolutions per minute of pump 13 (and therefore of engine 1). The left hand vertical scale represents pressures in line 33 to the same scale as the vertical scale in FIGURE 7, whilst the right hand vertical scale represents the values of torque in curve F, FIGURE 7, corresponding to different pressures in line 33, each torque value in the right hand scale of FIGURE 8 being the same distance from the base line as is the corresponding pressure value (from curve F) in the left hand scale of FIGURE 8.

The pressure available in line 33 is a function of engine speed and the setting of bleed valve 41. A family of curves of engine speed against line 33 pressures can be plotted for different settings of bleed valve 41. Curve J represents the case when the pedal 43 is only depressed a small way and is short of the point at which throttle 51 is fully open, bleed valve 41 being only slightly open. Curve K represents the case when throttle 51 is fully open, bleed valve 41 being about half open. Curve L represents the case when both throttle 51 and bleed valve 41 are fully open.

Of the three curves J, K and L, curve J corresponds to a part torque condition of the engine (the throttle 51 being only partly open) and it is possible to plot dotted line curve M of engine torque (from the right-hand vertical scale), against engine speed, for this throttle setting. Curves K and L both correspond to the full torque condition of the engine and a single dotted line curve N of engine torque against engine speed can be plotted which represents the full-torque/speed characteristic of the engine.

In the case of curves J and M, when the throttle is first opened to the extent specified the engine speed will rise because it has only its own inertia and its own internal friction and those of transmission unit 3 and pump 13 to overcome. As the speed rises the pressure in line 33 will rise along curve J until it reaches 5 lbs. per square inch when the clutch will start to engage. When the engine reaches the speed at which curve M intersects curve J, the clutch is feeding back to the engine as much torque as the engine can provide at the throttle setting corresponding to curve M, so that the engine cannot accelerate further without acceleration of the vehicle. Whether and to what extent the vehicle will accelerate beyond this point depends upon the load, e.g. whether the vehicle is on the level or facing up or down a hill. If the vehicle continues to accelerate the rising engine speed will cause the pressure in line 33 to rise further up curve J, but the torque cannot rise appreciably owing to the levelling off of curve M. A point will therefore be reached at which the ratio of transmission unit 3 will begin to rise from the lowest ratio.

The same considerations apply in the case of curves K and L except that they both correspond to full throttle condition of the engine and both are considered in relation to a single curve N of engine speed/torque. The point of intersection of curve L with curve N takes place at a higher engine speed than in the case of curve K since bleed valve 41 is further open. The result of the smaller slope of curve L as compared with curve K is that the engine continues to accelerate to a greater extent, in the case of curve L than in the case of curve K, after the torque transmitting capacity of the clutch reaches the same value as the engine torque, before the transmission unit begins to change from the lowest ratio.

The condition necessary for the retention of transmission unit 3 in the lowest ratio during engagement of the clutch, when starting the vehicle from rest, is that the torque versus actuating pressure characteristic of the clutch should be such that, at the intersection of any of the curves of line-33-pressure versus engine-speed (e.g. curves J, K and L of FIGURE 8), with a corresponding curve of engine torque versus engine speed, the pressure in line 33 at such intersection shall not exceed that necessary to balance the downward force acting on piston 20 as a result of torque reaction at the rollers, combined with the force from spring 24 when the engine torque represented by the intersection in question is being transmitted through transmission unit 3 in its lowest ratio. Such downward forces on piston 20 can be ascertained from FIGURE 6 by drawing curves such as curves such as curves D and E corresponding respectively to the torques at the various intersections of the engine torque curves and line-33-pressure curves of FIGURE 8. The torque at any such intersection produces a torque reaction at the rollers which is the sum of the input torque and the output torque to and from transmission unit 3 and, as this is dependent on ratio, the complete curve (e.g. curves B and C in FIGURE 6), can be plotted for various ratios by a simple calculation. For the present purpose however, only the torque reaction values at the lowest ratio need be calculated and the preload value of spring 22 added to give the required total values.

The curves G, H and I of FIGURE 7 are curves of transmission unit 3 input torque versus line 33 pressure at which transmission unit 3 just starts to move from lowest ratio in the presence of roller torque reaction corresponding to that input torque. The relationship between roller torque reaction and input torque at the clutch is a function of ratio but as this is constant (being the lowest ratio) each of the curves G, H and I is derived from the left hand side values of a relatively large number of curves such as D and E of FIGURE 6, each value representing a different roller torque reaction and being divided by a torque division factor appropriate to the lowest ratio. However each of the curves G, H and I represents a different combination of piston 20 area and spring 24 preload. Curve G represents a spring 24 preload force which is just balanced by a line 33 pressure of 5 lbs. per square inch and a preferred piston 20 area. Curve I represents a zero spring 24 preload force and a small piston 20 area, whilst curve H represents a very large spring 24 preload force and a very large piston 20 area. These curves G, H and I may be regarded as low ratio retention curves and, so long as these curves lie wholly above the clutch characteristic curve F, the transmission unit 3 will remain in lowest ratio during engagement of the clutch when the vehicle is moved from rest. Curve I does not satisfy this criterion but will ensure low ratio starting at torques above the intersection with curve F. The higher ratio starting at low torque values may be advantageous in certain applications.

The correspondence between the engine torque curves of FIGURE 8 (e.g. M and N), and the ratio-adjusted values of torque transmitted by the clutch (as read off the right hand vertical scale), at any given pressure in line 33 (as read off the left hand scale) only holds good for the lowest ratio of transmission unit 3, since a suitable division factor is applied in the plotting of clutch torque curve F of FIGURE 8 to take account of the torque multiplication as between the input and the output of transmission unit 3 when it is in its lowest ratio.

The way in which retention of low ratio during clutch engagement is dependent on the clutch characteristic will be clear when it is considered that the engine and adjusted clutch torque values of right hand vertical scale in FIGURE 8 which correspond with the values of line 33 pressure of the left hand vertical scale, are obtained from curve F of FIGURE 7. If, instead of curve F, a curve with a steeper slope had been chosen, the graduations of the right hand vertical scale of FIGURE 8 would have been more widely spaced apart, and the engine torque curves (e.g. M, N), would be correspondingly raised.

Factors influencing the clutch characteristic are the number and type of inter-engaging surfaces, the effective piston area of the clutch actuator, the mechanical advantage of any link mechanism through which the actuator piston force is applied to the inter-engaging surfaces of the clutch and the preload of the push-off spring.

It will be clear from a study of FIGURES 6, 7 and 8 that, to maintain the same starting characteristics, the degree of preload of spring 24 (represented by the level, but not the slope, of curve A), and the degree of preload of the clutch pull-off spring are closely related and must vary in the same sense. The travel of the clutch preload spring will be small so that its rate can be ignored. Higher levels of curve A involve higher levels of total downward piston force (curves such as D and E). This in turn involves higher pressures at points along the left hand vertical scale of FIGURE 8. This means that the clutch will engage prematurely unless its preload spring is strengthened so as to raise the level of the zero point on the right hand vertical scale of FIGURE 8.

A detailed construction of an embodiment of the invention according to FIGURE 11 will now be described in relation to FIGURE 13.

A main casing 97 contains transmission unit 3 which is a toroidal race rolling friction transmission unit. Bolted to the front end of casing 97 is a bell housing 98 which contains a powder coupling generally indicated as 192. Bell housing 98 is bolted to the rear end of the crankcase of the engine 1. The crankshaft of engine 1 terminates in a flange 114, to which is bolted a flywheel 115. The input shaft 118 of transmission unit 3 extends forwardly through the centre of powder coupling 192 and terminates in a spigot running in a plain bearing 119 recessed into the end of the engine crankshaft. A central boss 121 fits over a polygon profile on the forward extension of shaft 118. This profile consists of a generally triangular cross section with convexly curved sides and radiused corners so as to lock the two parts together against relative rotation but to permit axial sliding.

The rearward half 193 of the outer casing 194 of powder coupling 192 is welded to an annular flange formed at the rearward end of boss 121. The front half 195 of casing 194 which is welded to rear half 193 around a peripheral lip, is sprung rearwards so that its inner annular margin presses against an annular flange of a boss 196 which carries the internal disc 197 of powder coupling 192 and forms a seal against the leakage of powder from the coupling. The outer surface of a forwardly extending cylindrical portion of boss 196 is formed with splines which mate with splines on the inner surface of a flanged boss 198 bolted to flywheel 115. The cylindrical extension of boss 196 is a running fit over the cylindrical extension of boss 121 to ensure that disc 197 is disposed centrally within casing 194.

It will be noted that the disc 197 which is normally the driven member of a powder coupling, is fixed to the engine whilst the casing 194, which is normally the driving member, is fixed to the input shaft 118 of the transmission unit 3. This is permissible because, when the engine is started from rest (not by tow starting) the clutch 5 is disengaged so that the powder coupling is only required to overcome the friction within transmission unit 3 plus the drag of pump 13. This is not beyond the capabilities of the powder coupling when the disc is the driving member, particularly when the coupling is almost completely filled with powder. Once the casing starts to rotate the characteristic of the coupling is the same as it is when the casing is the driving member so that during normal driving conditions it is of no practical consequence which way round the coupling is oriented. The orientation chosen is dictated by the conditions obtained during tow starting when the roles of the two parts of the coupling are reversed. When the disc is the driving member the stalled torque capacity of the coupling is low so that if the disc were to be connected to transmission unit 3 and the casing to the engine, the torque that could be transmitted might well be insufficient to rotate the engine, particularly if it was cold and stiff. With the coupling 192 oriented as shown in FIGURE 13 however, it is capable of transmitting any required torque to the engine during a tow starting operation and its characteristic, with the casing as the driving member, can be chosen so that it will slip sufficiently at low revolutions to enable the transmission unit 3 to be turned and changed to a high ratio without imposing an unacceptable towing load upon the towing vehicle or preventing the vehicle from "roll starting" down a hill of reasonable gradient.

A pump housing 125 has a forward tubular extension surrounding shaft 118 and separated therefrom by a fluid seal 126, a drain hole 176 being provided in the body of pump housing 125 to drain down fluid reaching this seal from the pump 13. Input shaft 118 is journalled in the front end wall of casing 97 by means of a needle roller bearing 199, forward thrusts on the part of input shaft 118 being borne by a thrust washer 200.

Pump housing 125 is recessed, in the face thereof remote from powder coupling 192, to form a housing for a fluid pump of the so-called "crescent" type. The pumping members comprise an inner gear 127, splined to shaft 118 at 128, and an outer gear 129 mounted for rotation in the outer marginal part of the pump housing recess which is eccentric with relation to shaft 118. Outer teeth of inner gear 127 mesh with inner teeth of outer gear 129 at the lower part of the pump housing recess but there is a crescent-shaped gap between the teeth of the two gears in the upper part of the recess and this gap is filled by a stationary crescent-shaped land 130 integral with pump casing 125. The inlet and outlet ports are placed in horizontally opposite places in the regions of the tips of the crescent-shaped land 130, these ports being formed in a sealing plate 131 which covers the end of pump housing 125 and is trapped between the latter and the front end wall 132 of transmission unit housing 97. The meshing point of gears 127 and 129 forms the sealing zone of the pump and the crescent-shaped region forms the "carry-round" zone of the pump. Front end 132 of casing 97 is recessed with oilways and contains valves 42, 52 and 55 (FIGURE 11).

Figure 9:
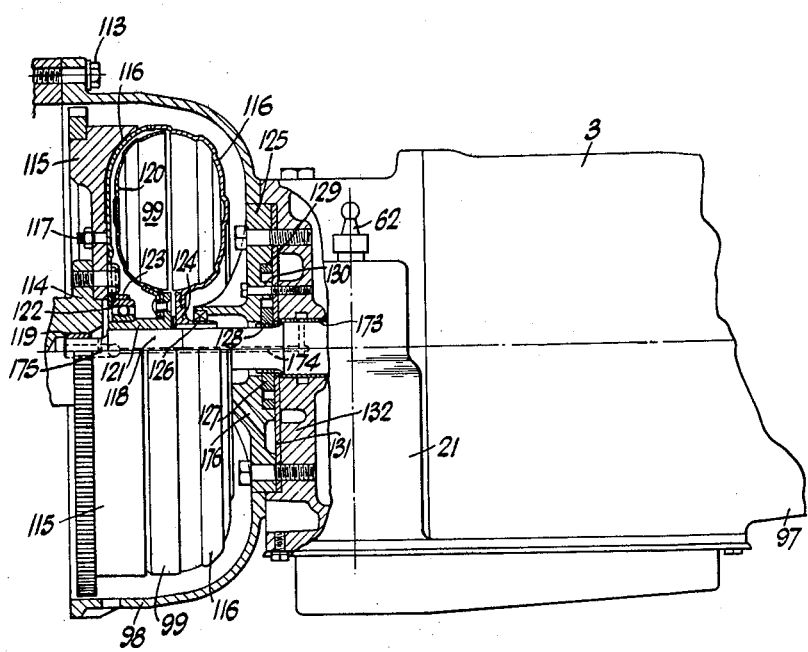
FIGURE 9 is a drawing of certain mechancial parts of one embodiment of the invention.

Also housed in casing 97 is the hydraulic ratio control cylinder 21, but this is not visible in the drawing as it stands on the viewer's side of the section plane. Its location is indicated in FIGURE 9, however, being the vertical cylindrical excrescence indicated by reference numeral 21 and engine braking control lever 62 can be seen projecting from the top of cylinder 21.

FIGURE 13 shows in part-sectioned form the internal arrangement of transmission unit 3 and this will now be described but only briefly since the precise form taken by transmission unit 3 does not form part of the present invention.

Two driving discs 201 and 202 have inwardly facing toroidal surfaces and are mounted on a central shaft 203, being prevented from rotation relative thereto by the mating surfaces being of polygon profile form, as hereinbefore described in relation to shaft 118 and boss 121 except that a four-sided polygon form is used as this facilitates sliding under load. Disc 202 is keyed to, and bears against a shoulder 204 integral with, shaft 203. The polygon profile by which disc 201 is keyed to shaft 203 is slightly barreled to permit a small amount of rocking movement which might arise from inaccuracies in the mating faces of the discs and rollers.

Between discs 201 and 202, and separated therefrom by two sets of three rollers, represented by rollers 205 and 206, is a driven disc 207 having outwardly facing toroidal surfaces on its two sides.

A main spider assembly 208 is made fast with casing 97 by means of an outer rim 209 which may be clamped between two parts of casing 97 and held in place by bolts used for clamping these two casing parts together. This is the construction shown in FIGURE 13. Spider assembly 208 is welded or otherwise securely fixed to a sleeve 210, which passes through the centre of driven disc 207 and provides a support for the bearing on which disc 207 rotates. This bearing has an inner race 211 fast with sleeve 210 and needle rollers 212. Beyond disc 207 a second spider assembly 213 is detachably fixed to sleeve 210 by means of splines or the like which should preferably be a tight fit. Spider assembly 213 is the mirror image of spider assembly 208 except that it has no outer rim such as 209 of the latter.

Each of spider assemblies 208 and 213 has three symmetrically disposed outwardly and radially extending arms such as arm 214 of spider assembly 208 and each arm carries a pin such as pin 215 on which are pivoted a main rocker lever such as 216 and an idler rocker lever such as 217, only the boss of which is shown in the drawing. These two levers, 216 and 217 have each an outwardly extending arm which engages by a ball and socket connection one end of a roller carrier, the lever 216 on one pin such as 215 engaging one end of the carrier associated with one roller, and the other end of that carrier engaging the lever corresponding to 217 on the pin corresponding to pin 215 on an adjacent arm (such as 214) of the spider 208. The three roller carriers are disposed in this manner symmetrically around the central shaft 203 and occupy the gaps between the arms of the spider.

Each of the rocker levers, such as 216, has an inwardly extending arm which terminates in a spigot such as 218 which is housed in a transverse hole in a cylindrical insert such as 219 which is held rotatably in a part-cylindrical slot in a lobe extending radially from a central control member which has three such lobes symetrically disposed around it, each lobe being linked by an insert such as 219 to the inwardly extending arm of one of the levers such as 216. Central control member 220 is secured by splines and a clip ring 221 to a sleeve 222 which extends through the inside of sleeve 210. Also splined to sleeve 222 is an operating lever 223 which extends in both directions normal to the surface of the drawing and is coupled by a linkage (not shown) to a shaft 224 at the bottom of casing 97. Shaft 224 is linked by a conventional system of levers to the lower end of piston rod 18 and rotates when the latter moves up and down. Rotation of shaft 224, via the said linkage and operating lever 223 causes rotation of control member 220 which results in tilt angle changes being applied to the rollers.

The rollers in the right hand part of the drawing, such as roller 206, are mounted and controlled in a manner which is the mirror image of the mounting and control of the left hand rollers such as 205, a second control member 225 being secured by splines and a clip ring 226 to the right hand end of sleeve 222 whereby control members 220 and 225 move together in unison.

The rollers such as 205 and 206 are mounted for rotation about pivot pins such as 227 and 228 fixed in roller carriers such as 229 and 230 which lie in generally tangential relation to the circle swept out by the centre of the circle which is the generator of facing toroidal surfaces of the discs. Each roller carrier is supported at both ends in ball joints as hereinbefore described.

FIGURE 13 gives a part-sectioned view of the discs, rollers, spiders, control members etc. hereinbefore described and is simplified by the omission of some of the items and parts of items standing behind the section planes. Any attempt to show what is so omitted would make the drawing too complicated to be readily understood without adding anything of significance to the information contained in the drawing which is not readily apparent from the above description thereof.

To the left of disc 201 there is shown an end loading device which consists of a cup 231 integral with the end of input shaft 118, the rim of cup 231 being coupled by sliding splines at its rim to a cam ring 232. A corresponding cam surface is formed on the back of disc 201 and between these two cam surfaces there is interposed a set of three conical rollers such as 233 held in a cage 234 and rotatable on an inner pin such as 235 and an outer ball 236 which takes the outward radial thrust component to which the rollers are subjected because of their conical form. Cam ring 232 is separated by a ball thrust race 237 from a presser member 238, an inwardly facing lip of which bears on a set 239 of spring washers of the Belville type which in turn bear on a second set 240 of similar but stronger spring washers, which bear against a flanged nut 241 screwed to the centre shaft 203. A lock-washer 242, keyed to shaft 203, secures nut 241 against rotation by means of peripheral lugs (not shown) which are bent over the flats of nut 241 after assembly.

Normally, when the transmission unit is at rest spring washer set 239 is compressed to provide a predetermined end preload forcing the discs and rollers into engagement, nut 241 being screwed up in assembly so that the stronger spring washer set 240 just touches the nut on one side and a shoulder on presser member 238 on the other side. When torque is applied to input shaft 118, cam 232 is turned and the torque is conveyed to disc 201 through rollers 233 and end thrust, tending to bring discs 201 and 202 together, is applied by reason of the shaping of the cam surfaces on cam 232 and disc 201, which is a function of the torque applied to input shaft 118. This thrust is applied through spring washer set 240 which has a rate such that it is not completely compressed at the maximum input torque for which the transmission unit is designed.

In the centre of cup 231, shaft 118 is bored out to form a support bearing for the forward end of centre shaft 203, a spigot of which rotates on needle rollers 243. The output of the transmission unit 3 is taken from disc 207 by means of a hollow bell-shaped member 244 having lugs on its outer rim which engage with notches (not shown) on the periphery of disc 207.

The end wall of bell member 244 is apertured to pass over centre shaft 203 and is secured, for instance by rivets (not shown) to a flange formed on the front end of output shaft 135 (see FIGURE 9), which is also bored out to receive a spigot formed on the rear end of centre shaft 203 which runs in this bore in needle roller bearing 136.

Clutch 5 and gear train 11 are housed in a casing 137 bolted to the rear end wall 133 of casing 97. The input member of clutch 5 comprises a cylindrical barrel 138 integral with an inwardly extending annular flange 139 which is centrally pierced and splined to shaft 135 so as to revolve therewith. An annular clip ring 140 secures flange 139, shaft 135 and the inner race of ball bearing 134 against relative axial movement.

The outer peripheral surface of barrel 138 is splined to mate with internal splines on four annular driving clutch plates 141, interleaved with which are five annular driven clutch plates 142 the outer peripheries are splined to mate with splines formed on the internal surface of a cylindrical driven clutch member 143. An annular bearer plate 144, which is of the same general shape as driving clutch plates 141 except that it is much thicker, also engages the splines on barrel 138 and is retained against axial movement in the forward direction by a stout clip ring 145 riding in a circumferential groove cut in the splines of barrel 138. The inner cavity of barrel 138 forms the cylinder of the clutch actuator and carries within it an annular piston 146 the outer periphery of which carries a sealing O ring 147 in engagement with the inner surface of barrel 138. Pressurised fluid enters the clutch actuator between flange 139 and piston 146, via duct 65 and forces piston 146 rearward to apply pressure to the clutch plates by means of a force-multiplying annular lever plate 148, which is in the form of a Belleville washer and serves in addition as a clutch pull-off spring and which is fulcrumed at about ¾ of its width from its inner periphery by a fulcrum ring 149 anchored to barrel 138 by means of projections from the latter which are threaded through suitable holes in lever plate 148 and fulcrum ring 149, the latter being restrained from axial movement by a stout clip ring riding in a circumferential groove machined in the said projections. Pressure is applied by the outer margin of lever plate 148 to a presser plate 151 splined to barrel 138.

The cylindrical driven clutch member 143 is supported at its rear end upon a flanged output boss 152 which engages the internal splines of member 143 and is secured against relative axial movement by a clip ring riding in a circumferential groove in the splines.

Output boss 152 surrounds, and is keyed (by means not shown), to the hub 153 of a bevel gear 154. Hub 153 is rotatably mounted on output shaft 135 of transmission unit 3 by means of a plain bearing sleeve 155.

Gear train 11 is of the same general type as the differential gear of a conventional vehicle final drive, having two facing coaxial bevel gears (an input gear and an output gear), meshing with two or more planet bevel gears mounted on a carrier for independent rotation about a transverse axis. "Forward" gear may be obtained by locking the carrier to either the input gear or the output gear so that the whole assembly rotates as a unit about the main axis. It is locked to the input gear in the arrangement of FIGURE 13. "Reverse" gear is obtained by locking the carrier to the gear train casing so that the input gear drives the output gear through the planet gears which reverse the direction of rotation. Bevel gear 154 is the input gear. Output bevel gear 156 has a hollow central boss which surrounds and rotates upon the rearward end of transmission unit output shaft 125 with a plain bearing bush 157 interposed between them, both being centralised and supported in casing 137 by means of a ball bearing 158 the inner race of which fits over the outside of the hollow central boss of bevel gear 156. A rearward extension shaft integral with the said boss is coupled by splines to a surrounding tubular output shaft 159 which forms the cardan shaft of the vehicle or is coupled thereto by universal joints in a conventional manner.

The planet carrier comprises a cylindrical body 160 having a central bore sleeved to rotate upon output shaft 135 of transmission unit 3. Body 160 has symmetrically disposed windows which receive planet pinions 161, rotatable upon axle pins 162 fitting in holes drilled radially through body 160.

The outer peripheral surface of body 160 is formed with splines which mesh with internal splines formed within a selector ring 163.

A selector fork 164 embraces selector ring 163 and engages the lower extremity of gear train control rod 30 so that fore and aft movement of the latter moves selector ring 163 fore and aft respectively. The boss 152 has a tubular rearward extension 165 the outside of which is formed with splines which can be engaged by the internal splines of selector ring 163 to lock body 160 to input gear 154. A similar tubular extension 166 is formed on the inner surface of the rear end wall of casing 137 which also can be engaged by the internal splines of selector ring 163. Both these extensions 165 and 166 have conical inner surfaces adapted respectively to mate with outer coned surfaces of two synchronising rings 167 and 168. These synchronising rings are formed with external splines adapted to mate with the internal splines of selector ring 163 before the latter moves into full engagement with extension 165 or 166 as the case may be so that synchronism between the extension (165 or 166) and body 160 may be brought about by friction between the extension (165 or 166) and the corresponding synchronising ring before the splines of the selector ring 163 encounter the splines of the extension (165 or 166).

A sleeve 167 is fitted over the rear end of the boss of output bevel gear 156 and is drilled with oilways 168 communicating between a sealing channel or slip ring 169 and duct 65 which runs through the centre of shaft 135. Slip ring 169 is supplied with pressurised fluid from valve 28' via fluid line 39 (neither of which is visible in the drawing).

Branch 64 (FIGURE 11) takes the form of a radial hole leading through shaft 135 from branch 65 to the centre of planet carrier body 160 whence it is discharged through suitable holes to the working surfaces of the gear train. Adjustable restrictor 67 (FIGURE 11) may conveniently take the form of an interchangeable inserted in branch 64. Restrictor 67 and the gear train lubrication system provide a leakage path in parallel with clutch 5 whereby a fine adjustment of the clutch engagement speed can be effected. The design of the hydraulic system as explained above in relation to FIGURES 6, 7 and 8, should preferably be such that the clutch would engage prematurely were branch 64 to be sealed off. Starting with the smallest size of nozzle in branch 65, it should be changed for a larger size if the clutch engages prematurely, and so on until optimum clutch operation is achieved. A detachable cover plate on the side of casing 137, and alignable radial drillings in planet carrier body 160 and selector ring 163 enable the nozzles to be interchanged without dismantling the gear train.

Leakage of fluid past O ring 147 on clutch actuator piston 146 passes into a space between the latter and lever plate 148. Suitable drillings through barrel 138 drain away this leakage fluid through the clutch plates to cool them. There is less tendency for leakage between the inner margin of piston 146 and shaft 135 because centrifugal force drives the fluid away from this region; any leakage that exists at this region is flung outwards and directed by a collector ring projecting inwardly from the rear surface of piston 146 (and also forming the inner abutment for lever plate 148) which is drilled to direct the fluid to the space outside the collector ring whence it passes into the clutch plates in the same way as leakage past O ring 147.

Valves 28 and 28' are formed as part of a target assembly 170 bolted to the top of casing 137 above the gears. Valve 28 projects rearwardly from the turret assembly and its actuator bar passes across the front of the lower extension of control rod 30 because there is no convenient space to house the valve at the same side of the gear rod as that to which it moves (i.e. forwards) when "forward" gear is to be engaged. Gear rod 30 is mounted in a ball joint pivot 171 at the top of turret assembly 170 so that the knob 172 is moved rearwards to engage "forward" gear and vice versa for reverse gear. This is not an embarrassment to the driver however as, with conventional gears, the great majority of floor mounted gear-shift levers are moved backwards to engage top gear and many three-speed gear boxes of this type involve forward movement of the gear shift lever to obtain "reverse."

Valve 28' projects laterally away from the viewer, in relation to FIGURE 11 so that it is not seen in that drawing but its operating bar 29' is clearly visible; it lies below bar 29.

Boss 152, which rotates with gear 154 and with the normally driven member 143 of clutch 5, is formed with skew gear teeth 245 which engage with a skew gear which is not visible in the drawing but which is mounted on and fast with a vertical shaft 246. This shaft 246 extends downwards to a pocket 247, formed in the bottom of casing 137, which houses a gear pump (pump 17) comprising a driving gear 248 meshing with an idler gear 249. Inlet pipes leading to and from pump 17 are not shown.

Valve 19 is preferably located alongside valve 28' and is not visible in the drawing. Valve 177 is preferably located in the front end wall of casing 97 together with valves 52 and 55. The following oilways not shown in the drawing, and extending from front to rear of the transmission unit 3, are required, namely; one connecting the outlet port of valve 55 to the inlet port of pump 17; one extending from the sump at the bottom of casing 97 near its lowest point, to the inlet port of pump 17; one extending from the outlet port of pump 17 to the inlet port of valve 177 and communicating with port 182 of valve 19; one extending from pressure line 33 or any of the components connected to it which are located in the front wall of casing 97, to port 181 of valve 19 and port 32 of valve 28.

Figure 12:
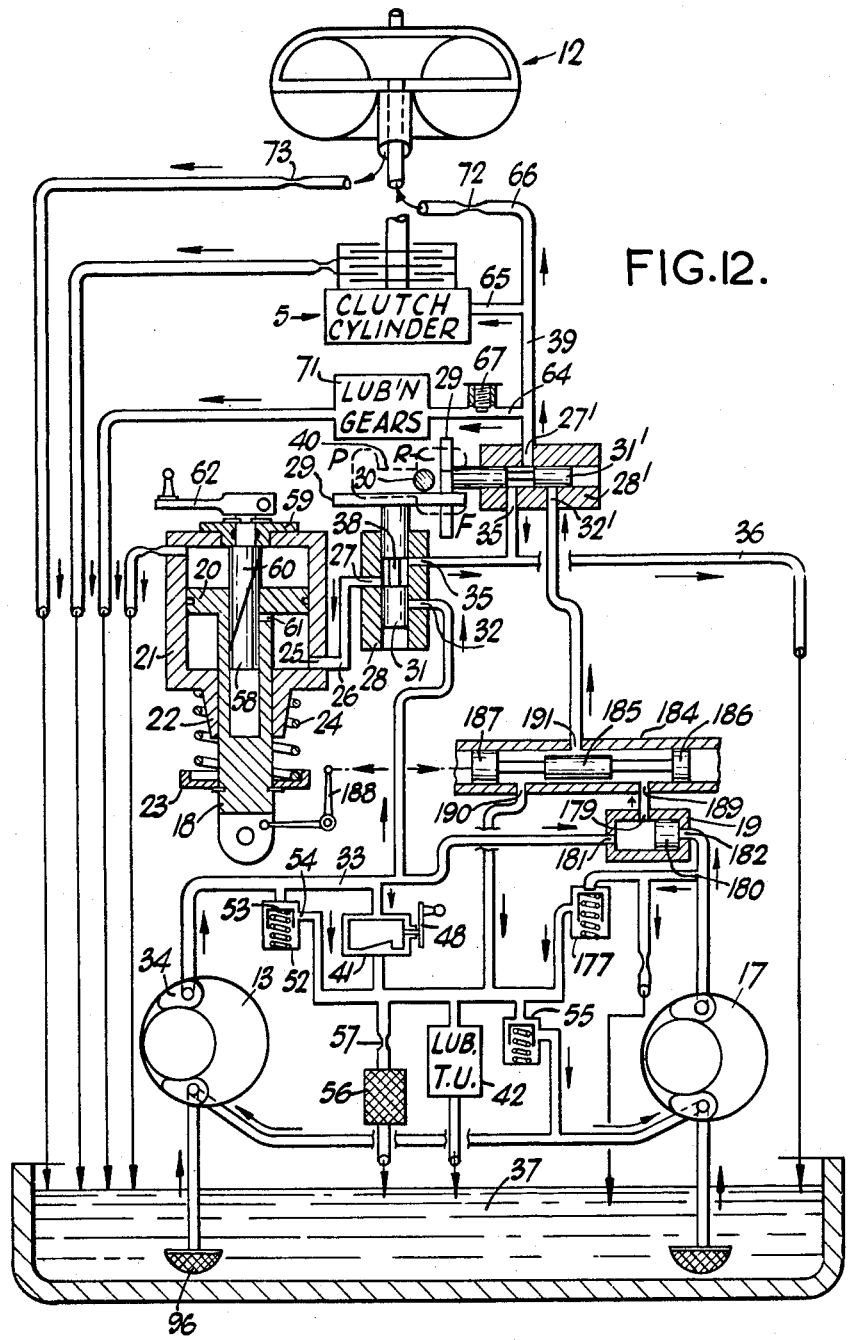
FIGURE 12 is a schematic diagram of an hydraulic circuit which is a modification of that illustrated in FIGURE 11.

An alternative detailed design based on FIGURE 4 will now be described in relation to FIGURE 12 which shows the hydraulic circuit of this design. FIGURE 12 differs from FIGURE 11 in that a fluid flywheel is used as coupling 12 and in that a valve 184 is interposed between valve 19 and valve 28'. In other respects FIGURES 11 and 12 are similar and the same reference numerals are allotted to corresponding items in both figures. It is sometimes desirable to provide an overload torque relief device in the transmission system to protect transmission unit 3.

A toroidal race rolling friction transmission unit must have means for forcing together the driving and driven discs into engagement with the rollers between the discs. If, as is frequently the case, this end loading force is provided by a cam device, such as that above described in relation to FIGURE 13, between an input member and the driving disc (or one of them where the transmission unit is of the double-ended type), then this load is dependent upon the input torque. Excessive end loading, rather than excessive shearing loads at the driving points between the rollers and the discs, is the most likely cause of premature failure due to excessive torque loads applied to the transmission unit; therefore all computations of possible excessive torque loads should be referred to the input end of a transmission unit of this type. It follows from this that the overload relief device must be placed on the input side of the transmission unit if it is of the type with a fixed overload yield level. If it is placed on the output side of the transmission unit it must have a yield value which varies with variation of the ratio of the transmission unit.

Of the devices suggested above for use as variable slip coupling 12 only the powder coupling is inherently suitable as a load relief device. A fluid flywheel provides no effective overload protection and a centrifugal clutch with a unidirectional self servo action is likely to be in the self servo state in the presence of at least some of the usual forms of overload circumstances which are envisaged (e.g. when the road wheels are locked by fierce braking on a slippery road surface, when the torque is in the driving direction) so that it cannot be relied upon to slip at a predictable torque unless elaborate steps are taken to limit the effectiveness of the self servo action.

In FIGURE 12 a fluid flywheel is used for coupling 12 and arrangements are made to control the torque capacity of clutch 5 according to the ratio of the transmission unit. The design is preferably such that the maximum torque which the clutch will transmit always exceeds by a predetermined margin the maximum torque which can be applied to it in any ratio to which transmission unit 3 may for the time being be set, when the engine is delivering its full torque to the input shaft of transmission unt 3. These torques, at clutch 5 will be relatively high at low ratios of transmission unit 3 and vice versa.

Valve 184 is a pressure control valve of the "potentiometer" type. It has three lands spaced apart, a central controlling land 185 and two outer sealing lands 186 and 187, slidable axially in a cylindrical bore by means of a linkage indicated diagrammatically by a bell crank lever 188 coupled to piston rod 18 of the ratio control cylinder 21. There are three ports communicating with the cylindrical bore of valve 184, a high pressure port 189 communicating with output port 179 of valve 19, a low pressure port 190 communicating with the fluid line from which the lubrication feed to the transmission unit 3 is taken, and an output port 191, spaced midway between ports 189 and 190 along the length of the bore of valve 184. Land 185 does not fit closely within the bore of valve 184 but has a clearance around it which provides a leakage path between ports 189 and 190 across which there is a substantially constant pressure gradient irrespective of the position of land 185 longitudinally along the bore. The pressure obtaining at output port 191 is dependent upon its position in relation to the leakage path along the length of land 185 and is greatest when the latter is moved to the left, which corresponds to low ratio positions of piston rod 18. The clearance around land 185 is exaggerated in FIGURE 12 which shows valve 184 in diagrammatic form. In practice, the leakage path around land 185 must be carefully proportioned in relation to the leakage through the various branches from pressure line 39 and the size of the pumps 13 and 17 must be such that the accumulated leakage paths from their outlets do not substantially affect the speed-versus-output pressure characteristics of the pumps. As regulated by valve 184 clutch 5 is thus controlled by a pressure which varies inversely with the ratio for the time being of transmission unit 3 and the range of pressures so applied to clutch 5 must be such that, combined with the characteristics of clutch 5, the ultimate torque capacity of the clutch exceeds the maximum torque which can be applied to the clutch when the engine is at full torque in the driving condition, by the required predetermined extent. If this criterion is satisfied, the torque as at the input shaft 2 of transmission unit 3 cannot exceed a fixed predetermined value, assuming that the inertia of the moving parts within the transmission unit itself can be ignored.

A branch 66 from pressure line 39 leads, via a restrictor 72 to variable slip coupling 12 (which, as indicated above, takes the form of a hydrokinetic coupling of the so-called "fluid-flywheel" type). From coupling 12 fluid is allowed to leak away to sump 37 via a restrictor 73. When gear control rod 30 is moved downwards and to the right into the "forward" slot in gate plate 40 (which is marked "F") prior to a tow starting operation, valve 28 is actuated to place cylinder 21 into communication with pressure line 33 and valve 28' is operated to connect clutch 5 to pressure line 33. Coupling 12 was previously cut off from the pressure line and will have drained down, through restrictor 73, and through restrictor 72, valve 28' (in its previous condition when rod 30 was central), and fluid line 36, to sump 37. Coupling 12 will not be completely emptied but its torque transmitting capacity will be considerably reduced. At the commencement of a tow starting operation therefore, pump 13 is initially stationary and pump 17 revolves as the vehicle starts to move. When a predetermined towing speed is reached the output of pump 17 is sufficient to engage the clutch. As the transmission unit 3 will be in low ratio the output from valve 184 will be a large proportion of the pressure delivered by pump 17. As the ratio changes towards a higher ratio (as previously described in relation to FIGURE 11) a smaller proportion of the pressure from pump 17 will reach clutch 5 from valve 184 but this is of no consequence as the torques involved in tow starting are relatively low as compared with the torques involved in driving.

The partial draining of coupling 12 is arranged to enable it to be slipped without appreciable resistance until its speed reaches a predetermined value which is compatible with the speed at which the vehicle can be conveniently towed for starting the engine. When this speed is approached the coupling starts to transmit torque and this torque increases in value as the speed of the coupling rises. When this torque exceeds that required to turn the engine the engine will revolve and will eventually start. In exceptionally cold weather the resistance of the engine may be abnormally high so that a higher towing speed will be needed to produce enough torque transmitting capacity at coupling 12 to overcome the higher engine resistance. The will be assisted by the gradual filling of coupling 12 via branch 66 and resistrictor 72.

FIGURE 9 shows an actual construction in which coupling 12 takes the form of a fluid flywheel. FIGURE 9 is similar to the left hand half of FIGURE 13 and corresponding items are designated with the same reference numerals in both figures.

Bell housing 98 contains a fluid flywheel of conventional type which is generally indicated as 99. The outer casing 116, of fluid flywheel 99 is fixed to flywheel 115 by studs such as 117, welded to the former. The driven member 120 of fluid flywheel 99 is rivetted to central boss 121 which is keyed to shaft 118 by means of a polygon profile as in the case of FIGURE 13. The outer surface of boss 121 carries a ball bearing 122 the outer race of which is held in a flanged ring 123 welded to the outer casing 116. Ball bearing 122 holds driven member 120 central within outer casing 116 despite any radial clearance in the polygon profile mating surfaces of shaft 118 and boss 121 since bearing 119 does not ensure this.

A flange 124 is welded to the inner margin of driving member 116 which is apertured to pass over shaft 118. A rearwardly extending tubular extension of flange 124 fits loosely around shaft 118 and passes within the forwardly extending tubular extension of pump housing 125 which is of somewhat larger diameter than is the case in the embodiment illustrated in FIGURE 13. Seal 126 fits between these two tubular extensions so that the interior of fluid flywheel 99 is in communication with drain passage 176. When fluid flywheel 99 is stationary therefore, about one half of its normal charge of fluid drains away through passage 176 into sump 37 in the base of casing 97.

Branch 66 from fluid pressure line 39 (see FIGURE 12) passes via an hydraulic slip ring 173 to a duct 174 drilled centrally in shaft 118 whence it passes through a radial passage 175 into the space between the end of the engine crankshaft and the bearing 122, and thence (after lubricating the latter and bearing 119) to the interior of fluid flywheel 99. A suitable restrictor may be located at any position between valve 28′ and passage 175 to act as restrictor 72 (FIGURE 5) and regulate the degree to which flow to fluid flywheel 99 can bypass the clutch actuator. Drain-down from fluid flywheel takes place through the centre of boss 124 into the hollow forward extension of pump body 125 and thence to the sump through duct 176, as already indicated.

FIGURE 9 shows the front part of casing 97 in unsectioned elevation. Internally this is the same as the embodiment illustrated in FIGURE 13 and the location of cylinder 21, on the side of casing 97 nearest to the viewer, may be seen from FIGURE 9 which also indicates the location of crank 62 which controls ratio over-ride valve 58.

The clutch and gear train are the same as for FIGURE 13 and when the hydraulic circuit of FIGURE 12 is used, valve 184 is located alongside piston rod 18 by which it is actuated and there is a saving in long oilways if valve 19 is also located near piston rod 18 since a single oilway can be taken from the outlet port of pump 17 to valve 117 and port 182 of valve 19, another from port 191 of valve 184 to port 32′ of valve 28′ and yet another from pressure line 33 or any of the components connected to it in the front end wall of casing 97, to port 32 of valve 28.

Figure 3:
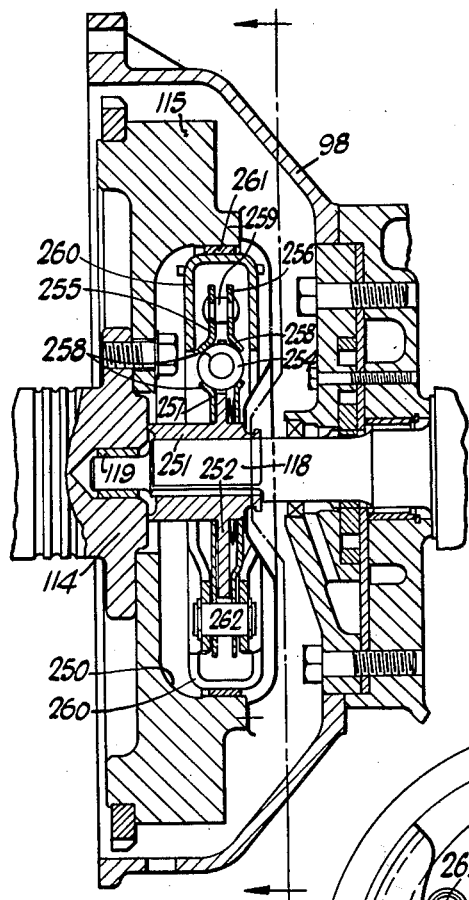
FIGURE 3 is a drawing, in longitudinal section, of an alternative form of a part of the embodiment of the invention which is illustrated in FIGURE 13.
Figure 10:
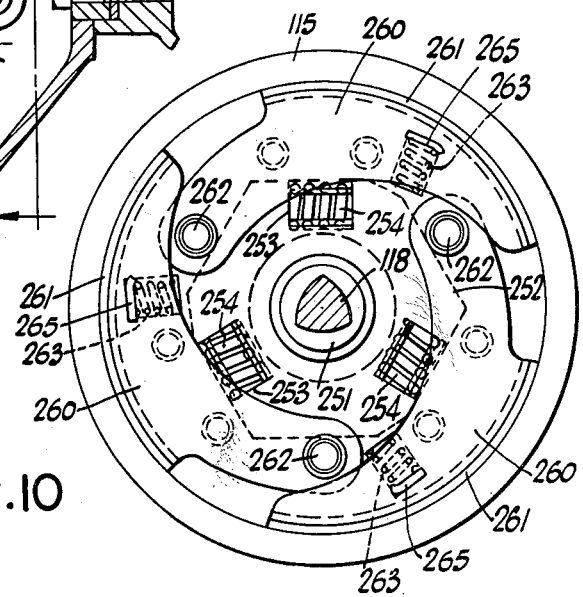
FIGURE 10 is a cross-sectional drawing of the item shown in FIGURE 3.

A variable slip coupling 12 in the form of a centrifugal clutch with a unidirectional self servo action will now be described in relation to FIGURE 3 which shows bell housing 98 in a form similar to that of FIGURE 13 but with this centrifugal clutch in place of the powder coupling. Pump body 125 and its contents are substantially the same in the two figures and will not be described again. FIGURE 10 shows an end elevation of the centrifugal clutch with the bell housing 98 and the input shaft 118 sectioned as indicated by the chain dotted line in FIGURE 3.

Input shaft 118 runs in a plain bearing 119 within a cavity in the end of the engine crankshaft 114, as in the case of FIGURE 13 and flywheel 115 is again bolted to a flange on the end of crankshaft 114 but the rim of flywheel 115 is extended rearwards to provide a cylindrical cavity 250 similar in form to a brake drum.

Input shaft is again formed with a polygon profile at its front end which mates with a coresponding profile inside a flanged boss 251. The flange 252 of boss 251 is seen from FIGURE 10 to have a generally hexagonal profile and it also has three rectangular slots 253 which accommodate three helical compression springs 254.

Flange 252 is flanked by two plates 255 and 256 which each have three rectangular slots 257 which register with slots 253 and whose radial sides bear against the ends of springs 254. The slots 257 have their tangential sides bent outwards as at 258 to form retaining pockets for springs 254. Rotation is transmitted between flange 252 and plates 255 and 256 through springs 254 in compression which introduces torsional resilience into the coupling. Plates 255 and 256 are fixed together by rivets 259.

The clutch has three shoes 260, each of which is of channel cross section and arcuate form in elevation over part of its length. A layer 261 of friction material is fixed to the outside surface of the base of the channel section this base being cut away over a substantial part of the length of the shoe to leave the two side walls of the channel as parallel plates which extend inwardly towards shaft 118 and are pivoted at their extremity on a pin 262 which passes through aligned holes in plates 255 and 256.

Radial springs 263 urge shoes 260 into engagement with the inner cylindrical surface of the drum 250 formed within the rim of flywheel 115 with a pressure sufficient to initiate the so-called 'leading shoe" action on the part of shoes 260 when flywheel 115 is rotated in the normal direction of engine rotation, that is to say anti-clockwise in relation to FIGURE 10. Springs 263 ride in aligned radial rectangular slots 264 in plates 255 and 256 the inner edges of which slots provide abutments for springs 263, which bear at their outer ends upon bridge plates 265 each of which passes through aligned slots in the side walls of the channel section of the coresponding shoe 260.

The position of a spring 263 along the length of its corresponding shoe 260 is not critical.

In the direction of torque transmission in which the engine would be supplying torque to the transmission unit 3, in the normal direction of rotation of the engine, shoes 260 are urged into engagement with drum surface 250 with a force which increases as the torque increases whereas in the opposite direction of torque transmission, apart from the relatively small amount of grip due to the pressure of springs 263, only centrifugal force is available to urge shoes 260 against drum surface 250. This latter condition obtains during tow starting or engine braking. For tow starting a convenient amount of initial slip is permitted, enabling the transmission unit 3 to be rotated without imposing an unacceptable towing load. As speed increases a point is reached at which centrifugal force provides sufficient grip to start the engine. For engine braking, the speed of the shoe assembly required to provide substantial grip, may be relatively high, since the absence of engine braking at low road speeds, that is to say when first resuming descent after being halted on a downgrade, is of little consequence. Before any dangerous road speed is attained the grip of shoes 260 on drum surface 250 will be ample to transmit the friction torque of the engine.

This type of variable slip coupling gives a measure of protection against excessive torque loads on the transmission unit 3 such as might arise in the event of engine seizure at a substantial road speed; the direction of torque transmission in that case being the "over-run" direction, as with tow starting or engine braking. No protection is afforded, however, against excessive loads which might arise in the event of the vehicle driving wheels being locked by fierce braking on a slippery road surface since in that case the direction of torque transmission would be the same as obtains when the engine is propelling the vehicle. If protection in this eventuality is required either the arrangement of FIGURE 12 should be used or a breakable link such as a shear pin must be introduced into the system between the engine and the transmission unit 3. In many applications of the invention the inertia of parts of the transmission system beyond the output shaft of the transmission unit 3 (e.g. road wheels and tyres, final drive gears, propeller shaft, gear train and rotating clutch components) will be sufficient to ensure that the road wheels cannot be brought to rest in a time short enough to impose excessive loads on the transmission unit 3.

The arrangements of FIGURES 4, 11 and 12 may be modified by driving pump 13 from the output shaft 4 of transmission unit 3, rather than the input shaft 2. Ratio control may or may not be effected from the same pump (e.g. pump 13 could be retained in the position shown in FIGURE 4 and confined to ratio control, an additional pump being driven from output shaft 4 and controlling clutch engagement except under conditions of resumption of engine braking or tow starting). If pump 13 is driven from output shaft 4 and feeds ratio cylinder 21 as well as clutch 5 the performance of the ratio control system is such as to maintain a constant speed on the part of the load for any given setting of the demand member (pedal 43, FIGURE 5), the engine speed varying automatically to maintain the demanded speed on the part of the load.

Although the invention has been illustrated by examples in which an hydraulic control system is used, it must be understood that the invention is not limited to such methods of control and that they may be replaced by analogous control agencies, for instance mechanical, electrical, electronic, pneumatic and the like.

I claim:

1. A transmission system for coupling a prime mover to a load comprising a variable ratio transmission unit of the rolling friction type having a plurality of rollers which provide a driving connection between toroidal surfaces of coaxial driving and driven discs, support means for the rollers permitting them to assume different attitudes with respect to the axis about which the discs rotate to vary the transmission ratio through the transmission unit, the said support means comprising roller positioning means to oppose torque reaction to which the rollers are subjected and to adjust the position of each roller along a line substantially tangential to the torus of which the said disc surfaces form part to initiate ratio changes on the part of the rollers by precession, at least one ratio control fluid pressure operated actuator associated with the said roller positioning means, a clutch between the transmission unit and the load to connect and disconnect the transmission unit to and from the load, a fluid pressure operated actuator to actuate the clutch, a fluid pressure pump coupled to an input member of the transmission unit, a fluid line connecting the pump to the ratio control actuator and to the clutch actuator, a demand member and a coupling therefrom to a fuel regulator of the prime mover, fluid pressure modifying means to modify pump output in the said fluid line, and a coupling between the demand member and the fluid pressure modifying means.

2. A transmission system as claimed in claim 1 further including a coupling interposed between the prime mover and an input shaft of the transmission unit, said coupling having a first part linked to an output shaft of the prime mover and a second part linked to the input shaft of the transmission unit, said coupling adapted, at speeds below a predetermined speed on the part of the member of the front coupling which is connected to the input shaft of the transmission unit, to have a relatively low torque-transmitting capacity at least in the direction of torque transmission in which torque would be applied to the prime mover from the said input shaft when it rotates in a direction which is the same as the normal rotational direction of the prime mover.

3. A transmission system as claimed in claim 2 in which the clutch is a hydraulically operated wet plate clutch and the coupling is a hydrokinetic coupling, with means, sensitive to rotation of a member of the transmission system, for increasing the charge of fluid in the hydrokinetic coupling and for reducing that charge when the rotational speed of that member of the transmission system is respectively either above or below a predetermined approximate value.

4. A transmission system as claimed in claim 2 in which the coupling is a powder coupling having its exterior or casing member connected to the input member of the transmission unit and its internal rotor connected to the output member from the prime mover.

5. A transmission system as claimed in claim 4 in which the powder coupling is so chosen that its maximum torque transmitting capacity has a value which exceeds by a predetermined proportion the maximum working torque which the transmission system is designed to withstand at the input shaft of the transmission unit whereby the coupling serves as an overload relief device.

6. A transmission system as claimed in claim 2 in which the clutch is a centrifugal clutch with a higher torque transmitting capacity for any given rotational speed in the direction of torque transmission in which the prime mover would drive the load as compared with its torque transmitting capacity at the same speed in the direction of torque transmission in which the load would drive the prime mover in its normal direction of rotation.

7. A transmission system as claimed in claim 6 in which the centrifugal clutch has a drum connected to the prime mover and pivoted shoes carried on a member coupled to the transmission unit the pivots being so positioned as to have a leading shoe action in one direction of torque transmission.

8. A transmission system as claimed in claim 1 having first means responsive to the rotational speed of a first part of the transmission system located between the prime mover and the said clutch, and second means responsive to the rotational speed of a second part of the transmission system located between said clutch and the load, and selection means to put said clutch selectively into a torque transmitting condition under control of the first speed responsive means when the first part is rotating in one predetermined direction of rotation and at a speed in excess of a predetermined speed and under control of the second speed responsive means when the second part is rotating in one predetermined direction of rotation as a result of forces other than torque transmitted to the load from the prime mover.

9. A transmission system as claimed in claim 8 in which the second speed responsive means comprises a pump insensitive to speeds below a predetermined low speed but sensitive to speeds above that speed.

10. A transmission system as claimed in claim 11 further comprising a pressure modulating valve coupled to said ratio control actuator to vary the maximum torque transmitting capacity of said clutch in temporary dependence upon the ratio of the transmission unit where said maximum is relatively high for low ratios and relatively low for high ratios, of the transmission unit.

11. A transmission system as claimed in claim 8 in which the said clutch comprises fluid pressure actuating means operable to engage the clutch for the transmission of torque on the application thereto of fluid under pressure, in which the first speed responsive means is a first fluid pump coupled to the input member of the transmission unit and the second speed responsive member is a second fluid pump coupled to an output member for connecting the said clutch to the load, and wherein said selection means comprises a changeover fluid valve connected to the output ports of the first and second pumps and means to operate the said valve to selectively connect the output port of one of the said pumps to the clutch actuating means.

12. A transmission system as claimed in claim 11 in which the said valve operating means comprises a member linked to said demand member associated with the selection of the ratio of the transmission unit.

13. A transmission system as claimed in claim 11 in which the said valve operating means comprises a valve member exposed to fluid delivered by each of the two pumps and movable in dependence on a fluid pressure differential to connect to the clutch actuating means that one of the said pumps which is delivering the higher pressure and to disconnect the other one of the said pumps from the clutch actuator.

14. A transmission system as claimed in claim 13 comprising a pressure limiting valve associated with the first fluid pump and adapted to by-pass the output of the first fluid pump when it exceeds a first predetermined pressure whereby the output is then maintained at but cannot exceed the first predetermined pressure and comprising a pressure limiting valve associated with the second fluid pump and adapted to by-pass the output of the second fluid pump when it exceeds a second predetermined pressure whereby that output is then maintained at but cannot exceed the second predetermined pressure, the first predetermined pressure exceeding the second predetermined pressure by a substantial amount.

15. A transmission system as claimed in claim 8 with a gear train interposed between the said clutch and the load such gear train being manually adjustable to give at least a first condition providing a connection therethrough in which the direction of rotation as between the input to and the output from the gear train is reversed and a second condition providing a connection therethrough in which the direction of rotation as between the input to and the output from the gear train is not reversed, and wherein said second part of the transmission system is located between the clutch and the gear train.

16. A transmission system as claimed in claim 15 in which a control member for the gear train co-operates with the clutch actuator to put the same into torque transmitting condition for the direction of torque transmission in which the prime mover would apply driving torque to the load, only when an additional movement is made on the point of the said gear train control member to an advanced position beyond the position reached at the time when engagement of one of the said conditions of connection has been completed within the gear train, and in which withdrawal of the gear train control member from the said advanced position conditions the clutch to permit relative rotation in the said direction of torque transmission.

17. A transmission system as claimed in claim 1 in which the ratio control actuator comprises a first actuator of relatively small effective piston area, a second actuator of relatively large effective piston area, means for applying the modified output of the pump to both actuators, the first actuator being coupled to the said mechanism in a manner such that, when pressure fluid is applied to it from the pump, it tends to drive the said mechanism in a direction which raises the ratio of the transmission unit, the second actuator being coupled to the said mechanism in a manner such that, when pressure fluid is applied to it from the pump, it tends to drive the said mechanism in a direction which lowers the ratio of the transmission unit, a further demand member and a coupling therefrom to valve means having two parts co-operating to admit or cut off the flow of the said fluid to the second actuator, one of such parts being coupled to a movable part of the second actuator the other of such parts being coupled to the further demand member in a manner such that, when the further demand member is in a rest position the flow of the said fluid is cut off from the second actuator and when the further demand member is operated away from the said rest position the said fluid is admitted to the second actuator to move it in the said direction which lowers the ratio of the transmission unit until, in the course of such movement, the two valve parts have resumed relative positions cutting off the flow of the said fluid to the second actuator, at a position in the operating range of the second actuator which corresponds to the position to which the further demand member has been moved, means being provided for urging the said mechanism in the direction which lowers the ratio of the transmission with a force which decreases as the said mechanism approaches the extreme low ratio position.

18. A transmission system as claimed in claim 17 in which the first actuator and the second actuator are contained within a single cylinder accommodating a single piston having a piston rod protruding through and in sealing relationship with one end wall of the cylinder the space within the cylinder surrounding the piston rod constituting the first actuator and the space within the cylinder on the side of the piston remote from the piston rod constituting the second actuator, the effective piston area of the second actuator being greater than that of the first actuator.

19. A transmission system as claimed in claim 18 in which the valve means associated with the said further demand member comprises a bore within the piston rod co-operating with a closure member within such bore and coupled to the further demand member and adapted under control of the further demand member to put the two sides of the cylinder, on opposite sides of the piston, into communication with one another.

20. A transmission system for coupling a prime mover to a load comprising a variable ratio transmission unit of the rolling friction type having an input shaft and an output shaft, at least one toroidally surfaced input disc coupled to the input shaft and at least one toroidally surfaced output disc coupled to the output shaft, bearings for the two discs upon which they may rotate coaxially and by which they are positioned so that their toroidal surfaces form parts of a torus generated by a circle whose centre rotates about the rotational axis of the discs, at least one roller providing a driving connection between the input disc and the output disc, support means for the roller providing a bearing for the roller upon which it may rotate about an axis intersecting the rotational axis of the discs, a trunnion pivot for the bearing permitting the bearing and the roller together to pivot about a ratio axis substantially tangential to the circle swept out by the centre of the torus generator circle with freedom to move bodily, axially of the trunnion pivot, means to oppose torque reaction forces to which the roller is subjected in the course of transmitting torque from the driving disc to the driven disc such means comprising a first fluid pressure operated actuator operatively coupled to the bearing of the roller to control movement thereof axially of the said trunnion pivot whereby the ratio of the transmission unit may be controlled, means to couple a prime mover to the said input shaft, means to couple the said output shaft to a load said last mentioned means comprising a clutch controllable to selectively transmit torque from the output shaft to the load and to permit relative rotation between the output shaft and load, a second fluid pressure operated actuator for controlling the clutch, fluid pressure supply means coupled to the input shaft to deliver fluid at a pressure dependent upon the rotational speed of the input shaft, a demand member adapted for connection to fuel supply regulating means of the prime mover, a fluid pressure modulator, a fluid line interconnecting the fluid pressure supply means and the fluid pressure modulator, a fluid pressure line interconnecting the fluid pressure modulator and the first actuator and the second actuator and an operative connection between the demand member and the fluid pressure modulator to modulate fluid pressure to both the first actuator and the second actuator according to the setting of the demand member.

References Cited by the Examiner

UNITED STATES PATENTS

| | | | |
|---|---|---|---|
| 2,092,447 | 9/37 | Fleischel | 192—3.5 |
| 2,123,006 | 7/38 | Hayes | 74—472 |
| 2,190,831 | 2/40 | Dodge | 74—731 |
| 2,709,926 | 6/55 | Jandasek | 74—645 |
| 2,715,455 | 8/55 | Miller | 192—85 |
| 2,796,222 | 6/57 | Frankel. | |
| 2,901,074 | 8/59 | Badin | 192—85 |
| 2,907,428 | 10/59 | Erwin et al. | 192—85 |
| 2,945,574 | 7/60 | Plume | 192—85 |
| 3,004,447 | 10/61 | Sand | 74—472.1 |

DON A. WAITE, *Primary Examiner.*